US 012185260B2

United States Patent
Chen et al.

(10) Patent No.: US 12,185,260 B2
(45) Date of Patent: Dec. 31, 2024

(54) COMMUNICATION METHOD AND TERMINAL DEVICE

(71) Applicant: Huawei Technologies Co., Ltd., Shenzhen (CN)

(72) Inventors: Yan Chen, Shanghai (CN); Rentian Ding, Shanghai (CN); Bingguang Peng, Shanghai (CN); Feng Qian, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 360 days.

(21) Appl. No.: 17/789,470

(22) PCT Filed: Oct. 28, 2020

(86) PCT No.: PCT/CN2020/124335
§ 371 (c)(1),
(2) Date: Jun. 27, 2022

(87) PCT Pub. No.: WO2021/129120
PCT Pub. Date: Jul. 1, 2021

(65) Prior Publication Data
US 2023/0041001 A1    Feb. 9, 2023

(30) Foreign Application Priority Data
Dec. 27, 2019   (CN) ................... 201911381048.0

(51) Int. Cl.
*H04W 52/34*    (2009.01)
*H04W 52/36*    (2009.01)

(52) U.S. Cl.
CPC ....... *H04W 52/346* (2013.01); *H04W 52/367* (2013.01)

(58) Field of Classification Search
CPC ............. H04W 52/346; H04W 52/367; H04W 52/281; H04W 88/06; H04W 52/34; H04W 52/288
See application file for complete search history.

(56) References Cited

U.S. PATENT DOCUMENTS 7,162,244 B1 *   1/2007   Toskala ................. H04W 36/08
                                                       455/452.2
2016/0255593 A1   9/2016   Blankenship et al.
(Continued)

FOREIGN PATENT DOCUMENTS

| CN | 106134263 A | 11/2016 |
| CN | 106165501 A | 11/2016 |

(Continued)

OTHER PUBLICATIONS

"Revised TP on LTE-NR power sharing," 3GPP TSG-RAN WG1#92, R1-1803420, Athens, Greece, Total 5 pages; 3rd Generation Partnership Project, Valbonne, France (Feb. 26-Mar. 2, 2018).
(Continued)

*Primary Examiner* — Angelica Perez
(74) *Attorney, Agent, or Firm* — Leydig, Voit & Mayer, Ltd.

(57) ABSTRACT

This application provides a communication method in a dual-connectivity mode. In the communication method, maximum transmit power used by a terminal device to send a message corresponding to a main network protocol in a semi-persistent power sharing mode is maximum transmit power 2, maximum transmit power used by the terminal device to send a message corresponding to a secondary network protocol is maximum transmit power 3, the maximum transmit power 2 is less than theoretical maximum transmit power corresponding to the main network protocol, and the maximum transmit power 3 is greater than the
(Continued)

theoretical maximum transmit power corresponding to the main network protocol.

20 Claims, 10 Drawing Sheets

(56) References Cited

U.S. PATENT DOCUMENTS

| | | | |
|---|---|---|---|
| 2017/0013565 A1 | 1/2017 | Pelletier et al. | |
| 2017/0034792 A1* | 2/2017 | Shao | H04W 52/40 |
| 2020/0163023 A1* | 5/2020 | Pelletier | H04W 52/38 |

FOREIGN PATENT DOCUMENTS

| | | |
|---|---|---|
| CN | 108566672 A | 9/2018 |
| CN | 109309954 A | 2/2019 |
| CN | 110062451 A | 7/2019 |
| CN | 110167123 A | 8/2019 |
| CN | 110267339 A | 9/2019 |
| CN | 110495222 A | 11/2019 |
| WO | 2018171673 A1 | 9/2018 |
| WO | 2018231755 A1 | 12/2018 |

OTHER PUBLICATIONS

"Power sharing for EN-DC," 3GPP TSG RAN WG4 Meeting NR-AH#1801, R4-1800398, San Diego, CA, USA, Total 5 pages, 3rd Generation Partnership Project, Valbonne, France (Jan. 18-21, 2018).

"TP for 38.817-01—Power Sharing—Pcmax for EN-DC in sub-6Ghz," TSG-RAN Working Group 4 (Radio) AH-1801, R4-1800264, San Diego, CA, USA, Total 4 pages, 3rd Generation Partnership Project, Valbonne, France (Jan. 22-26, 2018).

* cited by examiner

600

┌─ 601: In a single-connection mode, a terminal device sends a first message at first transmit power by using a first network protocol ┌─ 602: In a dual-connectivity mode and a dynamic power sharing mode, the terminal device sends a second message at second transmit power by using the first network protocol, and sends a third message by using a second network protocol ┌─ 603: In the dual-connectivity mode and the dynamic power sharing mode, the terminal device receives a first power control message sent by a network device, where the first power control message indicates to increase transmit power corresponding to the first network protocol ┌─ 604: In the dual-connectivity mode and the dynamic power sharing mode, the terminal device sends a fourth message at third transmit power based on the first power control message by using the first network protocol, and sends a fifth message by using the second network protocol, where the second transmit power is less than the first transmit power, the third transmit power is less than or equal to the second transmit power, and both the second message and the fourth message correspond to a first service type ┌─ 605: In the dual-connectivity mode and the dynamic power sharing mode, the terminal device sends a sixth message at sixth transmit power by using the first network protocol, and sends a seventh message by using the second network protocol, where the sixth message corresponds to a second service type ┌─ 606: In the dual-connectivity mode and the dynamic power sharing mode, the terminal device receives a third power control message sent by the network device, where the third power control message indicates to increase the transmit power corresponding to the first network protocol ┌─ 607: In the dual-connectivity mode and the dynamic power sharing mode, the terminal device sends an eighth message at seventh transmit power based on the third power control message by using the first network protocol, and sends a ninth message by using the second network protocol, where the eighth message corresponds to the second service type, the sixth transmit power is less than the first transmit power, and the seventh transmit power is less than or equal to the sixth transmit power, where when a priority of the first service type is higher than a priority of the second service type, the sixth transmit power is less than the second transmit power; or when the priority of the first service type is lower than the priority of the second service type, the sixth transmit power is greater than the second transmit power

901 — A terminal device sends second indication information to a network device, where the second indication information indicates that a semi-persistent power sharing mode is supported in a dual-connectivity mode 902 — The terminal device receives third indication information sent by the network device, where the third indication information indicates theoretical maximum transmit power in the dual-connectivity mode and the semi-persistent power sharing mode, and the theoretical maximum transmit power corresponds to a main network protocol in the dual-connectivity mode 903 — In the dual-connectivity mode and the semi-persistent power sharing mode, the terminal device sends a twelfth message at twelfth transmit power by using the main network protocol, and sends a thirteenth message at thirteenth transmit power by using a secondary network protocol in the dual-connectivity mode 904 — In the dual-connectivity mode and the semi-persistent power sharing mode, the terminal device receives a fifth power control message and a sixth power control message, where the fifth power control message indicates to increase transmit power corresponding to the main network protocol, and the sixth power control message indicates to increase transmit power corresponding to the secondary network protocol 905 — In the dual-connectivity mode and the semi-persistent power sharing mode, the terminal device sends a fourteenth message at fourteenth transmit power based on the fifth power control message by using the main network protocol, and sends a fifteenth message at fifteenth transmit power based on the sixth power control message by using the secondary network protocol, where the twelfth transmit power is greater than or equal to the fourteenth transmit power, the twelfth transmit power is less than the theoretical maximum transmit power, the thirteenth transmit power is less than or equal to the fifteenth transmit power, and the fifteenth transmit power is greater than or equal to the theoretical maximum transmit power

┌─ 1001: A terminal device sends second indication information to a network device, where the second indication information indicates that a semi-persistent power sharing mode is supported in a dual-connectivity mode ┌─ 1002: The terminal device receives third indication information sent by the network device, where the third indication information indicates theoretical maximum transmit power in the dual-connectivity mode and the semi-persistent power sharing mode, and the theoretical maximum transmit power corresponds to a main network protocol in the dual-connectivity mode ┌─ 1003: In the dual-connectivity mode and the semi-persistent power sharing mode, the terminal device sends a twelfth message at twelfth transmit power by using the main network protocol, and sends a thirteenth message at thirteenth transmit power by using a secondary network protocol in the dual-connectivity mode, where the twelfth message corresponds to a third service type ┌─ 1004: In the dual-connectivity mode and the semi-persistent power sharing mode, the terminal device receives a fifth power control message and a sixth power control message, where the fifth power control message indicates to increase transmit power corresponding to the main network protocol, and the sixth power control message indicates to increase transmit power corresponding to the secondary network protocol ┌─ 1005: In the dual-connectivity mode and the semi-persistent power sharing mode, the terminal device sends a fourteenth message at fourteenth transmit power based on the fifth power control message by using the main network protocol, and sends a fifteenth message at fifteenth transmit power based on the sixth power control message by using the secondary network protocol, where the twelfth transmit power is greater than or equal to the fourteenth transmit power, the twelfth transmit power is less than the theoretical maximum transmit power, the thirteenth transmit power is less than or equal to the fifteenth transmit power, the fifteenth transmit power is greater than or equal to the theoretical maximum transmit power, and the fourteenth message corresponds to the third service type

CONT.
FROM
FIG. 10A

1006 — In the dual-connectivity mode and the semi-persistent power sharing mode, the terminal device sends a sixteenth message at sixteenth transmit power by using the main network protocol, and sends a seventeenth message by using the secondary network protocol, where the sixteenth message corresponds to a fourth service type 1007 — In the dual-connectivity mode and the semi-persistent power sharing mode, the terminal device receives a seventh power control message, where the seventh power control message indicates to increase the transmit power corresponding to the main network protocol 1008 — In the dual-connectivity mode and the semi-persistent power sharing mode, the terminal device sends an eighteenth message at seventeenth transmit power based on the seventh power control message by using the main network protocol, and sends a nineteenth message by using the secondary network protocol, where the eighteenth message corresponds to the fourth service type, and the seventeenth transmit power is less than or equal to the sixteenth transmit power, where when a priority of the third service type is higher than a priority of the fourth service type, the sixteenth transmit power is less than the twelfth transmit power; or when the priority of the third service type is lower than the priority of the fourth service type, the sixteenth transmit power is less than the twelfth transmit power

FIG. 10B

COMMUNICATION METHOD AND TERMINAL DEVICE

CROSS-REFERENCE TO RELATED APPLICATIONS

This application is a national stage of International Application No. PCT/CN2020/124335, filed on Oct. 28, 2020, which claims priority to Chinese Patent Application No. 201911381048.0, filed on Dec. 27, 2019. Both of the aforementioned applications are hereby incorporated by reference in their entireties.

TECHNICAL FIELD

This application relates to the communications field, and more specifically, to a communication method and a terminal device.

BACKGROUND

A terminal device may receive a reference message sent by a network device, measure the reference message, and determine, in a manner of outer-loop power control or closed-loop power control in a protocol, uplink transmit power used by the terminal device to send an uplink message. Uplink transmit power of a terminal device is interfered with by communication between another terminal device and a network. Maximum uplink transmit power is an important factor for network coverage. In consideration of balance between coverage and interference, the 3rd Generation Partnership Project (3GPP) protocol defines different power classes for the terminal device, for example, a power class 2 and a power class 3. Maximum transmit power in the power class 2 is 26 decibel-milliwatts (decibel relative to one milliwatt, dBm), and maximum transmit power in the power class 3 is 23 dBm. In addition, in consideration of costs and craftsmanship, the protocol may allow a specific tolerance for actual maximum transmit power in each power class. The tolerance is generally from −3 dBm to +2 dBm. For example, in a long term evolution (long term evolution, LTE) system, supported maximum uplink transmit power of the terminal device in the power class 3 is 23 dBm, and an uplink message may be actually sent at a maximum of 20 dBm to 25 dBm.

With development of communications technologies, the terminal device may support multi-RAT dual connectivity (MR-DC), so that the terminal device can simultaneously send and receive messages by using two mobile network protocols. In an example of 4G-5G dual connectivity (E-UTRANR Dual Connectivity, EN-DC), the terminal device may access a 4G core network, and perform data transmission by using a main network (MN)—LTE network protocol, and a secondary network (SN)—new radio (NR) network protocol. The terminal device is limited by uplink transmit power in a process of sending uplink data. Therefore, when LTE is preferred, transmit power of an NR message may be excessively low or even 0. Further, because the network device cannot receive an uplink NR message sent by the terminal device, the network device may not send a downlink NR message to the terminal device, or the network device may even be disconnected from the terminal device.

SUMMARY

This application provides a communication method and a terminal device, to improve signaling receiving and sending stability in a dual-connectivity mode.

According to a first aspect, a communication method is provided, including: in a single-connection mode, sending a first message at first transmit power by using a first network protocol; in a dual-connectivity mode and a dynamic power sharing mode, sending a second message at second transmit power by using the first network protocol, and sending a third message by using a second network protocol, where a time domain resource occupied by the second message at least partially overlaps a time domain resource occupied by the third message, the first network protocol is a main network protocol in the dual-connectivity mode, and the second network protocol is a secondary network protocol in the dual-connectivity mode; in the dual-connectivity mode and the dynamic power sharing mode, receiving a first power control message sent by a network device, where the first power control message indicates to increase transmit power corresponding to the first network protocol; and in the dual-connectivity mode and the dynamic power sharing mode, sending a fourth message at third transmit power based on the first power control message by using the first network protocol, and sending a fifth message by using the second network protocol, where a time domain resource occupied by the fourth message at least partially overlaps a time domain resource occupied by the fifth message, the second transmit power is less than the first transmit power, and the third transmit power is less than or equal to the second transmit power.

The single-connection mode may be a scenario in which a terminal device receives and sends messages by using only one network protocol.

The dual-connectivity mode may be a scenario in which the terminal device uses two different network protocols, and may also be referred to as multi-RAT dual connectivity (MR-DC). A type of MR-DC mainly includes 4G-5G dual connectivity (E-UTRA NR dual connectivity, EN-DC), 5G-4G dual connectivity (NR E-UTRA Dual Connectivity, NE-DC), and 5G-core network 4G-5G dual connectivity (NG-RAN E-UTRA-NR Dual Connectivity, NGEN-DC).

In an example, the type of the dual-connectivity mode is EN-DC. In this case, the first network protocol may be a 4G network protocol, and the second network protocol may be a 5G network protocol.

In an example, the type of the dual-connectivity mode is NE-DC. In this case, the first network protocol may be a 5G network protocol, and the second network protocol may be a 4G network protocol.

In an example, the type of the dual-connectivity mode is NGEN-DC. In this case, the first network protocol may be a 4G network protocol, and the second network protocol may be a 5G network protocol. A difference between NGEN-DC and EN-DC is that a core network of NGEN-DC is 5G, and a core network of EN-DC is 4G.

Optionally, the first transmit power is maximum transmit power used to send a message by using the first network protocol in the single-connection mode.

In embodiments of this application, in the dual-connectivity mode and the dynamic power sharing mode, the terminal device reduces maximum transmit power corresponding to the main network protocol, to reserve power for the secondary network protocol, so that the reserved power can be used to send a message corresponding to the secondary network protocol. Therefore, when the terminal device needs to send a message corresponding to the main network protocol and the message corresponding to the secondary network protocol, the message corresponding to the secondary network protocol can still be sent, even though the transmit power corresponding to the main network protocol is excessively high. Because the transmit power has been reserved for the secondary network protocol, impact of the transmit power corresponding to the main network protocol on transmit power corresponding to the secondary network protocol can be reduced. For example, when a range of a cell corresponding to the main network protocol is far greater than that of a cell corresponding to the secondary network protocol, signal interference or relatively poor signal strength may often occur on a signal corresponding to the secondary network protocol. Therefore, when sending of the message corresponding to the main network protocol is not affected, maximum transmit power corresponding to the secondary network protocol is slightly greater than the maximum transmit power corresponding to the main network protocol. This is more conducive to maintaining signaling receiving and sending stability in the dual-connectivity mode, and helps improve user experience. In addition, it is relatively difficult for the transmit power corresponding to the main network protocol to reach the maximum transmit power that can be used by the terminal device. Therefore, a risk of antenna damage can be reduced.

With reference to the first aspect, in some embodiments of the first aspect, the second transmit power is maximum transmit power used to send a message by using the first network protocol in the dual-connectivity mode and the dynamic power sharing mode.

Optionally, in the dual-connectivity mode and the dynamic power sharing mode, at least a part of a difference between the second transmit power and maximum transmit power that can be implemented by the terminal device due to a limitation of a communications protocol is used to send a message corresponding to the second network protocol.

In embodiments of this application, after the transmit power corresponding to the main network protocol reaches a maximum value, the transmit power corresponding to the main network protocol is maintained or slightly reduced, so that the transmit power corresponding to the main network protocol can be slightly adjusted after reaching the maximum value, and impact of the transmit power corresponding to the secondary network protocol on the transmit power corresponding to the main network protocol can be reduced. Therefore, the message corresponding to the secondary network protocol can be sent without affecting sending of a message corresponding to the main network protocol. In addition, when the transmit power corresponding to the main network protocol does not reach the maximum value, the terminal device may increase, based on a power control message, the transmit power corresponding to the main network protocol. Therefore, complexity of a transmit power adjustment process can be reduced.

With reference to the first aspect, in some embodiments of the first aspect, before the sending a fifth message by using the second network protocol, the method further includes: in the dual-connectivity mode and the dynamic power sharing mode, receiving a second power control message sent by the network device, where the second power control message indicates to increase transmit power corresponding to the second network protocol; and in the dual-connectivity mode and the dynamic power sharing mode, determining, based on the second power control message, target preset transmit power used to send the fifth message; and the sending a fifth message by using the second network protocol includes: sending the fifth message at fifth transmit power by using the second network protocol, where a difference between the target preset transmit power and the fifth transmit power is less than or equal to a first preset threshold.

For example, the first preset threshold may be obtained by receiving radio resource control (radio resource control, RRC) information sent by the network device, and the RRC information may indicate the first preset threshold.

In embodiments of this application, if a difference between the transmit power corresponding to the secondary network protocol and preset transmit power is excessively large, a probability that the secondary network protocol is successfully sent is relatively low, and sending of the message corresponding to the secondary network protocol may be given up. Therefore, the first preset threshold is set, so that sending of some messages can be given up, to reduce power consumption of the terminal device. In addition, because the maximum transmit power corresponding to the main network protocol is reduced to increase the maximum transmit power corresponding to the secondary network protocol, a quantity of messages that the terminal device gives up sending can be reduced. This helps improve signaling receiving and sending stability in the dual-connectivity mode, and helps improve user experience.

With reference to the first aspect, in some embodiments of the first aspect, the first preset threshold is 3 decibel-milliwatts or 6 decibel-milliwatts.

With reference to the first aspect, in some embodiments of the first aspect, both the second message and the fourth message correspond to a first service type, and the method further includes: in the dual-connectivity mode and the dynamic power sharing mode, sending a sixth message at sixth transmit power by using the first network protocol, and sending a seventh message by using the second network protocol, where a time domain resource occupied by the sixth message at least partially overlaps a time domain resource occupied by the seventh message, the sixth message corresponds to a second service type, and the sixth transmit power is less than the first transmit power; in the dual-connectivity mode and the dynamic power sharing mode, receiving a third power control message sent by the network device, where the third power control message indicates to increase the transmit power corresponding to the first network protocol; and in the dual-connectivity mode and the dynamic power sharing mode, sending an eighth message at seventh transmit power based on the third power control message by using the first network protocol, and sending a ninth message by using the second network protocol, where a time domain resource occupied by the eighth message at least partially overlaps a time domain resource occupied by the ninth message, the eighth message corresponds to the second service type, and the seventh transmit power is less than or equal to the sixth transmit power, where when a priority of the first service type is higher than a priority of the second service type, the sixth transmit power is less than the second transmit power; or when the priority of the first service type is lower than the priority of the second service type, the sixth transmit power is greater than the second transmit power.

That a message corresponds to a service type may indicate that the message includes information about the service type. The service type may include a voice over long term evolution (VoLTE) service, a web browsing service, a video play service, a video call service, and the like. Specific priorities of various services may not be limited in this application.

Optionally, both the second message and the fourth message correspond to a first service type, and before the sending a fourth message at third transmit power based on the first power control message by using the first network protocol, the method further includes: determining the third transmit power based on the first service type and the first power control message.

In embodiments of this application, the transmit power corresponding to the main network protocol is adjusted based on a service type, so that a transmit power adjustment process can be more suitable for a plurality of types of communication scenarios. For example, when the message corresponding to the main network protocol is more important, the power reserved for the secondary network protocol may be reduced. For another example, when the message corresponding to the secondary network protocol is more important, the power reserved for the secondary network protocol may be increased. This is more conducive to improving user experience of the terminal device.

With reference to the first aspect, in some embodiments of the first aspect, in the dual-connectivity mode and the dynamic power sharing mode, maximum transmit power used to send a message by using the first network protocol is equal to maximum transmit power configured in a power class, and the dual-connectivity mode meets the power class.

In embodiments of this application, the terminal device meets the power class. This helps maintain component consistency of the terminal device.

With reference to the first aspect, in some embodiments of the first aspect, the power class is a power class 3.

In the power class 3, theoretical maximum transmit power configured in the power class is 23 dBm, and a tolerance is +2/−3 dBm. Therefore, in the dual-connectivity mode, the terminal device can use a maximum of 20 dBm to 25 dBm.

With reference to the first aspect, in some embodiments of the first aspect, the fifth message includes uplink control information.

The uplink control information may be, for example, a physical uplink control channel (PUCCH) or a sounding reference signal (SRS).

In embodiments of this application, the terminal device may send the uplink control information by using the secondary network protocol, to ensure that the terminal device has an opportunity to receive downlink data by using the secondary network protocol. This ensures user experience of the terminal device.

Optionally, before the terminal device sends the second message at the second transmit power by using the first network protocol, and sends the third message by using the second network protocol, the method further includes: sending, by the terminal device, first indication information to the network device, where the first indication information indicates that the terminal device supports the dynamic power sharing mode.

According to a second aspect, a communication method is provided, including: sending second indication information to a network device, where the second indication information indicates that a semi-persistent power sharing mode is supported in a dual-connectivity mode; obtaining theoretical maximum transmit power in the dual-connectivity mode and the semi-persistent power sharing mode, where the theoretical maximum transmit power corresponds to a main network protocol in the dual-connectivity mode; in the dual-connectivity mode and the semi-persistent power sharing mode, sending a twelfth message at twelfth transmit power by using the main network protocol, and sending a thirteenth message at thirteenth transmit power by using a secondary network protocol in the dual-connectivity mode; in the dual-connectivity mode and the semi-persistent power sharing mode, receiving a fifth power control message and a sixth power control message, where the fifth power control message indicates to increase transmit power corresponding to the main network protocol, and the sixth power control message indicates to increase transmit power corresponding to the secondary network protocol; and in the dual-connectivity mode and the semi-persistent power sharing mode, sending a fourteenth message at fourteenth transmit power based on the fifth power control message by using the main network protocol, and sending a fifteenth message at fifteenth transmit power based on the sixth power control message by using the secondary network protocol, where the twelfth transmit power is greater than or equal to the fourteenth transmit power, the twelfth transmit power is less than the theoretical maximum transmit power, the thirteenth transmit power is less than or equal to the fifteenth transmit power, and the fifteenth transmit power is greater than or equal to the theoretical maximum transmit power.

The dual-connectivity mode may be a scenario in which the terminal device uses two different network protocols, and may also be referred to as multi-RAT dual connectivity (MR-DC). A type of MR-DC mainly includes 4G-5G dual connectivity (E-UTRA NR dual connectivity, EN-DC), 5G-4G dual connectivity (NR E-UTRA Dual Connectivity, NE-DC), and 5G-core network 4G-5G dual connectivity (NG-RAN E-UTRA-NR Dual Connectivity, NGEN-DC).

In an example, the type of the dual-connectivity mode is EN-DC. In this case, the main network protocol may be a 4G network protocol, and the secondary network protocol may be a 5G network protocol.

In an example, the type of the dual-connectivity mode is NE-DC. In this case, the main network protocol may be a 5G network protocol, and the secondary network protocol may be a 4G network protocol.

In an example, the type of the dual-connectivity mode is NGEN-DC. In this case, the main network protocol may be a 4G network protocol, and the secondary network protocol may be a 5G network protocol. A difference between NGEN-DC and EN-DC is that a core network of NGEN-DC is 5G, and a core network of EN-DC is 4G.

In embodiments of this application, in the dual-connectivity mode and the semi-persistent power sharing mode, when configuring the theoretical maximum transmit power corresponding to the main network protocol, the network device reduces maximum transmit power corresponding to the main network protocol, so that a terminal device can send a message corresponding to the secondary network protocol at higher transmit power. Therefore, a probability of successfully sending the message corresponding to the secondary network protocol can be increased. For example, when a range of a cell corresponding to the main network protocol is far greater than that of a cell corresponding to the secondary network protocol, signal interference or relatively poor signal strength may often occur on a signal corresponding to the secondary network protocol. Therefore, when sending of the message corresponding to the main network protocol is not affected, maximum transmit power corresponding to the secondary network protocol is slightly greater than the maximum transmit power corresponding to the main network protocol. This is more conducive to maintaining signaling receiving and sending stability in the dual-connectivity mode, and helps improve user experience.

With reference to the second aspect, in some embodiments of the second aspect, the twelfth transmit power is actual maximum transmit power corresponding to the main network protocol in the dual-connectivity mode and the semi-persistent power sharing mode.

Optionally, the fifteenth transmit power is actual maximum transmit power corresponding to the secondary network protocol in the dual-connectivity mode and the semi-persistent power sharing mode.

In embodiments of this application, after the transmit power corresponding to the main network protocol reaches a maximum value, the transmit power corresponding to the main network protocol is maintained or slightly decreased. When the transmit power corresponding to the main network protocol does not reach the maximum value, the terminal device may increase, based on a power control message, the transmit power corresponding to the main network protocol, so that complexity of a transmit power adjustment process can be reduced.

With reference to the second aspect, in some embodiments of the second aspect, both the twelfth message and the fourteenth message correspond to a third service type, and the method further includes: in the dual-connectivity mode and the semi-persistent power sharing mode, sending a sixteenth message at sixteenth transmit power by using the main network protocol, and sending a seventeenth message by using the secondary network protocol, where the sixteenth message corresponds to a fourth service type; in the dual-connectivity mode and the semi-persistent power sharing mode, receiving a seventh power control message, where the seventh power control message indicates to increase the transmit power corresponding to the main network protocol; and in the dual-connectivity mode and the semi-persistent power sharing mode, sending an eighteenth message at seventeenth transmit power based on the seventh power control message by using the main network protocol, and sending a nineteenth message by using the secondary network protocol, where the eighteenth message corresponds to the fourth service type, and the seventeenth transmit power is less than or equal to the sixteenth transmit power, where when a priority of the third service type is higher than a priority of the fourth service type, the sixteenth transmit power is less than the twelfth transmit power; or when the priority of the third service type is lower than the priority of the fourth service type, the sixteenth transmit power is greater than the twelfth transmit power.

That a message corresponds to a service type may indicate that the message includes information about the service type. The service type may include a voice over long term evolution (voice over long term evolution, VoLTE) service, a web browsing service, a video play service, a video call service, and the like. Specific priorities of various services may not be limited in this application.

Optionally, both the twelfth message and the fourteenth message correspond to a third service type, and before the sending a fourteenth message at fourteenth transmit power based on the fifth power control message by using the main network protocol, the method further includes: determining the fourteenth transmit power based on the third service type and the fifth power control message.

In embodiments of this application, the maximum transmit power corresponding to the main network protocol is adjusted based on a service type, so that a transmit power adjustment process can be more suitable for a plurality of types of communication scenarios. For example, when the message corresponding to the main network protocol is more important, the power reserved for the secondary network protocol may be reduced. For another example, when the message corresponding to the secondary network protocol is more important, the power reserved for the secondary network protocol may be increased. This is more conducive to improving user experience of the terminal device.

Optionally, the dual-connectivity mode meets a power class 3.

In the power class 3, theoretical maximum transmit power configured in the dual-connectivity mode is 23 dBm, and a tolerance is +2/−3 dBm. Therefore, in the dual-connectivity mode, the terminal device can use a maximum of 20 dBm to 25 dBm due to a limitation of a communications protocol.

According to a third aspect, a terminal device is provided, including: a sending module, configured to: in a single-connection mode, send a first message at first transmit power by using a first network protocol, where the sending module is further configured to: in a dual-connectivity mode and a dynamic power sharing mode, send a second message at second transmit power by using the first network protocol, and send a third message by using a second network protocol, where a time domain resource occupied by the second message at least partially overlaps a time domain resource occupied by the third message, the first network protocol is a main network protocol in the dual-connectivity mode, and the second network protocol is a secondary network protocol in the dual-connectivity mode; and a receiving module, configured to: in the dual-connectivity mode and the dynamic power sharing mode, receive a first power control message sent by a network device, where the first power control message indicates to increase transmit power corresponding to the first network protocol. The sending module is further configured to: in the dual-connectivity mode and the dynamic power sharing mode, send a fourth message at third transmit power based on the first power control message by using the first network protocol, and send a fifth message by using the second network protocol. A time domain resource occupied by the fourth message at least partially overlaps a time domain resource occupied by the fifth message, the second transmit power is less than the first transmit power, and the third transmit power is less than or equal to the second transmit power.

With reference to the third aspect, in some embodiments of the third aspect, the second transmit power is maximum transmit power used by the sending module to send a message by using the first network protocol in the dual-connectivity mode and the dynamic power sharing mode.

With reference to the third aspect, in some embodiments of the third aspect, the receiving module is further configured to: before the sending module sends the fifth message by using the second network protocol, in the dual-connectivity mode and the dynamic power sharing mode, receive a second power control message sent by the network device, where the second power control message indicates to increase transmit power corresponding to the second network protocol. The terminal device further includes a processing module, configured to: in the dual-connectivity mode and the dynamic power sharing mode, determine, based on the second power control message, target preset transmit power used to send the fifth message. The sending module is specifically configured to send the fifth message at fifth transmit power by using the second network protocol, where a difference between the target preset transmit power and the fifth transmit power is less than or equal to a first preset threshold.

With reference to the third aspect, in some embodiments of the third aspect, the first preset threshold is 3 decibel-milliwatts or 6 decibel-milliwatts.

With reference to the third aspect, in some embodiments of the third aspect, both the second message and the fourth message correspond to a first service type. The sending module is further configured to: in the dual-connectivity mode and the dynamic power sharing mode, send a sixth message at sixth transmit power by using the first network protocol, and send a seventh message by using the second network protocol, where a time domain resource occupied by the sixth message at least partially overlaps a time domain resource occupied by the seventh message, the sixth message corresponds to a second service type, and the sixth transmit power is less than the first transmit power. The receiving module is further configured to: in the dual-connectivity mode and the dynamic power sharing mode, receive a third power control message sent by the network device, where the third power control message indicates to increase the transmit power corresponding to the first network protocol. The sending module is further configured to: in the dual-connectivity mode and the dynamic power sharing mode, send an eighth message at seventh transmit power based on the third power control message by using the first network protocol, and send a ninth message by using the second network protocol, where a time domain resource occupied by the eighth message at least partially overlaps a time domain resource occupied by the ninth message, the eighth message corresponds to the second service type, and the seventh transmit power is less than or equal to the sixth transmit power. When a priority of the first service type is higher than a priority of the second service type, the sixth transmit power is less than the second transmit power; or when the priority of the first service type is lower than the priority of the second service type, the sixth transmit power is greater than the second transmit power.

With reference to the third aspect, in some embodiments of the third aspect, the second transmit power is greater than or equal to maximum transmit power configured in a power class, and the dual-connectivity mode meets the power class.

With reference to the third aspect, in some embodiments of the third aspect, the power class is a power class 3.

With reference to the third aspect, in some embodiments of the third aspect, the fifth message includes uplink control information.

According to a fourth aspect, a terminal device is provided, including: a sending module, configured to send second indication information to a network device, where the second indication information indicates that a semi-persistent power sharing mode is supported in a dual-connectivity mode; and an obtaining module, configured to obtain theoretical maximum transmit power in the dual-connectivity mode and the semi-persistent power sharing mode, where the theoretical maximum transmit power corresponds to a main network protocol in the dual-connectivity mode. The sending module is further configured to: in the dual-connectivity mode and the semi-persistent power sharing mode, send a twelfth message at twelfth transmit power by using the main network protocol, and send a thirteenth message at thirteenth transmit power by using a secondary network protocol in the dual-connectivity mode. The obtaining module is further configured to: in the dual-connectivity mode and the semi-persistent power sharing mode, receive a fifth power control message and a sixth power control message, where the fifth power control message indicates to increase transmit power corresponding to the main network protocol, and the sixth power control message indicates to increase transmit power corresponding to the secondary network protocol. The sending module is further configured to: in the dual-connectivity mode and the semi-persistent power sharing mode, send a fourteenth message at fourteenth transmit power based on the fifth power control message by using the main network protocol, and send a fifteenth message at fifteenth transmit power based on the sixth power control message by using the secondary network protocol. The twelfth transmit power is greater than or equal to the fourteenth transmit power, the twelfth transmit power is less than the theoretical maximum transmit power, the thirteenth transmit power is less than or equal to the fifteenth transmit power, and the fifteenth transmit power is greater than or equal to the theoretical maximum transmit power.

With reference to the fourth aspect, in some embodiments of the fourth aspect, the twelfth transmit power is actual maximum transmit power corresponding to the main network protocol in the dual-connectivity mode and the semi-persistent power sharing mode.

With reference to the fourth aspect, in some embodiments of the fourth aspect, both the twelfth message and the fourteenth message correspond to a third service type. The sending module is further configured to: in the dual-connectivity mode and the semi-persistent power sharing mode, send a sixteenth message at sixteenth transmit power by using the main network protocol, and send a seventeenth message by using the secondary network protocol, where the sixteenth message corresponds to a fourth service type. The obtaining module is further configured to: in the dual-connectivity mode and the semi-persistent power sharing mode, receive a seventh power control message, where the seventh power control message indicates to increase the transmit power corresponding to the main network protocol. The sending module is further configured to: in the dual-connectivity mode and the semi-persistent power sharing mode, send an eighteenth message at seventeenth transmit power based on the seventh power control message by using the main network protocol, and send a nineteenth message by using the secondary network protocol, where the eighteenth message corresponds to the fourth service type, and the seventeenth transmit power is less than or equal to the sixteenth transmit power. When a priority of the third service type is higher than a priority of the fourth service type, the sixteenth transmit power is less than the twelfth transmit power; or when the priority of the third service type is lower than the priority of the fourth service type, the sixteenth transmit power is greater than the twelfth transmit power.

According to a fifth aspect, a terminal device is provided. The terminal device supports a dynamic power sharing mode in a dual-connectivity mode, and the terminal device includes a transceiver, configured to: receive and send messages in a single-connection mode, and receive and send messages in the dual-connectivity mode by using a main network protocol and a secondary network protocol in the dual-connectivity mode. In the single-connection mode, maximum transmit power used by the transceiver to send a message corresponding to the main network protocol is first maximum transmit power. In the dual-connectivity mode and the dynamic power sharing mode, maximum transmit power used by the transceiver to send a message corresponding to the main network protocol is second maximum transmit power. The second maximum transmit power is less than the first maximum transmit power.

The single-connection mode may be a scenario in which the terminal device receives and sends messages by using only one network protocol.

The dual-connectivity mode may be a scenario in which the terminal device simultaneously uses two different network protocols, and may also be referred to as multi-RAT dual connectivity (MR-DC). A type of MR-DC mainly includes 4G-5G dual connectivity (E-UTRA NR dual connectivity, EN-DC), 5G-4G dual connectivity (NR E-UTRA Dual Connectivity, NE-DC), and 5G-core network 4G-5G dual connectivity (NG-RAN E-UTRA-NR Dual Connectivity, NGEN-DC).

In an example, the type of the dual-connectivity mode is EN-DC. In this case, the first network protocol may be a 4G network protocol, and the second network protocol may be a 5G network protocol.

In an example, the type of the dual-connectivity mode is NE-DC. In this case, the first network protocol may be a 5G network protocol, and the second network protocol may be a 4G network protocol.

In an example, the type of the dual-connectivity mode is NGEN-DC. In this case, the first network protocol may be a 4G network protocol, and the second network protocol may be a 5G network protocol. A difference between NGEN-DC and EN-DC is that a core network of NGEN-DC is 5G, and a core network of EN-DC is 4G.

In the single-connection mode, maximum transmit power 1 that can be used by the terminal device may be detected. In the dual-connectivity mode and the dynamic power sharing mode, maximum transmit power 2 that can be used by the terminal device and that corresponds to the main network protocol may be detected. If the maximum transmit power 1 is greater than the maximum transmit power 2, it indicates that, in the dual-connectivity mode, the terminal device does not send the message corresponding to the main network protocol at maximum transmit power that can be implemented by the terminal device.

In embodiments of this application, in the dual-connectivity mode and the dynamic power sharing mode, the terminal device reduces maximum transmit power corresponding to the main network protocol, to reserve power for the secondary network protocol, so that the reserved power can be used to send a message corresponding to the secondary network protocol. Therefore, when the terminal device needs to simultaneously send a message corresponding to the main network protocol and the message corresponding to the secondary network protocol, the message corresponding to the secondary network protocol can still be sent, even though the transmit power corresponding to the main network protocol is excessively high. Because the transmit power has been reserved for the secondary network protocol, impact of the transmit power corresponding to the main network protocol on transmit power corresponding to the secondary network protocol can be reduced. For example, when a range of a cell corresponding to the main network protocol is far greater than that of a cell corresponding to the secondary network protocol, signal interference or relatively poor signal strength may often occur on a signal corresponding to the secondary network protocol. Therefore, when sending of the message corresponding to the main network protocol is not affected, maximum transmit power corresponding to the secondary network protocol is slightly greater than the maximum transmit power corresponding to the main network protocol. This is more conducive to maintaining signaling receiving and sending stability in the dual-connectivity mode, and helps improve user experience. In addition, it is relatively difficult for the transmit power corresponding to the main network protocol to reach the maximum transmit power that can be used by the terminal device. Therefore, a risk of antenna damage can be reduced.

With reference to the fifth aspect, in some embodiments of the fifth aspect, the maximum transmit power used by the transceiver to send the message corresponding to the secondary network protocol is third maximum transmit power. The terminal device further includes a processor, configured to determine preset transmit power corresponding to the secondary network protocol based on a power control message sent by a network device. A maximum value of the preset transmit power determined by the processor is fourth maximum transmit power, the fourth maximum transmit power is greater than or equal to the third maximum transmit power, and a difference between the fourth maximum transmit power and the third maximum transmit power is less than or equal to a first preset threshold.

For example, the first preset threshold may be obtained by receiving radio resource control (RRC) information sent by the network device, and the RRC information may indicate the first preset threshold.

The difference between the fourth maximum transmit power and the third maximum transmit power may be $10*\log_{10}(10^{\wedge}(\text{fourth maximum transmit power}/10)-10^{\wedge}(\text{third maximum transmit power}/10))$.

The maximum transmit power (third maximum transmit power) that is used by the terminal device and that corresponds to the secondary network protocol, and the maximum preset transmit power (fourth maximum transmit power) that is determined by the terminal device and that corresponds to the secondary network protocol may be detected. If a difference between the fourth maximum transmit power and the third maximum transmit power is less than the first preset threshold, it indicates that the terminal device does not send the message corresponding to the secondary network protocol at excessively low transmit power.

In embodiments of this application, if a difference between the transmit power corresponding to the secondary network protocol and preset transmit power is excessively large, a probability that the secondary network protocol is successfully sent is relatively low, and sending of the message corresponding to the secondary network protocol may be given up. Therefore, the first preset threshold is set, so that sending of some messages can be given up, to reduce power consumption of the terminal device. In addition, because the maximum transmit power corresponding to the main network protocol is reduced to increase the maximum transmit power corresponding to the secondary network protocol, a quantity of messages that the terminal device gives up sending can be reduced. This helps improve signaling receiving and sending stability in the dual-connectivity mode, and helps improve user experience.

With reference to the fifth aspect, in some embodiments of the fifth aspect, the first preset threshold is 3 decibel-milliwatts or 6 decibel-milliwatts.

With reference to the fifth aspect, in some embodiments of the fifth aspect, the maximum transmit power used by the transceiver to send the message corresponding to a first service type and the main network protocol is fifth maximum transmit power, and the maximum transmit power used by the transceiver to send the message corresponding to a second service type and the main network protocol is sixth maximum transmit power. When a priority of the first service type is higher than a priority of the second service type, the fifth maximum transmit power is greater than the sixth maximum transmit power; or when the priority of the first service type is lower than the priority of the second service type, the fifth maximum transmit power is less than the sixth maximum transmit power.

In the dual-connectivity mode and the dynamic power sharing mode, maximum transmit power of different services may be detected, to determine whether the terminal device can flexibly adjust maximum transmit power based on a service type.

In embodiments of this application, the transmit power corresponding to the main network protocol is adjusted based on a service type, so that a transmit power adjustment process can be more suitable for a plurality of types of communication scenarios. For example, when the message corresponding to the main network protocol is more important, the power reserved for the secondary network protocol may be reduced. For another example, when the message corresponding to the secondary network protocol is more important, the power reserved for the secondary network protocol may be increased. This is more conducive to improving user experience of the terminal device.

With reference to the fifth aspect, in some embodiments of the fifth aspect, the dual-connectivity mode meets a power class 3.

In embodiments of this application, the terminal device meets the power class. This helps maintain component consistency of the terminal device.

According to a sixth aspect, a terminal device is provided. The terminal device supports a semi-persistent power sharing mode in a dual-connectivity mode, and the terminal device includes a transceiver, configured to: in the dual-connectivity mode and the semi-persistent power sharing mode, receive and send messages by using a main network protocol and a secondary network protocol in the dual-connectivity mode; receive third indication information sent by a network device, where the third indication information indicates theoretical maximum transmit power corresponding to the main network protocol in the dual-connectivity mode and the semi-persistent power sharing mode. In the dual-connectivity mode and the semi-persistent power sharing mode, maximum transmit power used by the transceiver to send a message corresponding to the main network protocol is seventh maximum transmit power, maximum transmit power used by the transceiver to send a message corresponding to the secondary network protocol is eighth maximum transmit power, the seventh maximum transmit power is less than the theoretical maximum transmit power, and the eighth maximum transmit power is greater than the theoretical maximum transmit power.

The dual-connectivity mode may be a scenario in which the terminal device simultaneously uses two different network protocols, and may also be referred to as multi-RAT dual connectivity (MR-DC). A type of MR-DC mainly includes 4G-5G dual connectivity (E-UTRA NR dual connectivity, EN-DC), 5G-4G dual connectivity (NR E-UTRA Dual Connectivity, NE-DC), and 5G-core network 4G-5G dual connectivity (NG-RAN E-UTRA-NR Dual Connectivity, NGEN-DC).

In an example, the type of the dual-connectivity mode is EN-DC. In this case, the main network protocol may be a 4G network protocol, and the secondary network protocol may be a 5G network protocol.

In an example, the type of the dual-connectivity mode is NE-DC. In this case, the main network protocol may be a 5G network protocol, and the secondary network protocol may be a 4G network protocol.

In an example, the type of the dual-connectivity mode is NGEN-DC. In this case, the main network protocol may be a 4G network protocol, and the secondary network protocol may be a 5G network protocol. A difference between NGEN-DC and EN-DC is that a core network of NGEN-DC is 5G, and a core network of EN-DC is 4G.

In the dual-connectivity mode and the semi-persistent power sharing mode, theoretical maximum transmit power configured by the network device, maximum transmit power 3 that can be used by the terminal device and that corresponds to the main network protocol, and maximum transmit power 4 that can be used by the terminal device and that corresponds to the main network protocol may be detected. If the maximum transmit power 3 is less than the theoretical maximum transmit power, and the maximum transmit power 4 is greater than the theoretical maximum transmit power, it indicates that, in the dual-connectivity mode and the semi-persistent power sharing mode, the terminal device may send the message corresponding to the secondary network protocol at higher power.

In embodiments of this application, in the dual-connectivity mode and the semi-persistent power sharing mode, when configuring the theoretical maximum transmit power corresponding to the main network protocol, the network device reduces the maximum transmit power corresponding to the main network protocol, so that the terminal device can send the message corresponding to the secondary network protocol at higher transmit power. Therefore, a probability of successfully sending the message corresponding to the secondary network protocol can be increased. For example, when a range of a cell corresponding to the main network protocol is far greater than that of a cell corresponding to the secondary network protocol, signal interference or relatively poor signal strength may often occur on a signal corresponding to the secondary network protocol. Therefore, when sending of the message corresponding to the main network protocol is not affected, maximum transmit power corresponding to the secondary network protocol is slightly greater than the maximum transmit power corresponding to the main network protocol. This is more conducive to maintaining signaling receiving and sending stability in the dual-connectivity mode, and helps improve user experience.

With reference to the sixth aspect, in some embodiments of the sixth aspect, the maximum transmit power used by the transceiver to send the message corresponding to a third service type and the main network protocol is ninth maximum transmit power, and the maximum transmit power used by the transceiver to send the message corresponding to a fourth service type and the main network protocol is tenth maximum transmit power. When a priority of the third service type is higher than a priority of the fourth service type, the ninth maximum transmit power is greater than the tenth maximum transmit power; or when the priority of the third service type is lower than the priority of the fourth service type, the ninth maximum transmit power is less than the tenth maximum transmit power.

That a message corresponds to a service type may indicate that the message includes information about the service type. The service type may include a voice over long term evolution (VoLTE) service, a web browsing service, a video play service, a video call service, and the like. Specific priorities of various services may not be limited in this application.

In the dual-connectivity mode and the semi-persistent power sharing mode, maximum transmit power of different services may be detected, to determine whether the terminal device can flexibly adjust maximum transmit power based on a service type.

In embodiments of this application, the maximum transmit power corresponding to the main network protocol is adjusted based on a service type, so that a transmit power adjustment process can be more suitable for a plurality of types of communication scenarios. For example, when the message corresponding to the main network protocol is more important, the power reserved for the secondary network protocol may be reduced. For another example, when the message corresponding to the secondary network protocol is more important, the power reserved for the secondary network protocol may be increased. This is more conducive to improving user experience of the terminal device.

According to a seventh aspect, a terminal device is provided, including modules configured to perform the methods in any one of the first aspect and the second aspect or the possible implementations of the first aspect and the second aspect.

According to an eighth aspect, a computer program storage medium is provided. The computer-readable medium stores program code, and when the computer program code is run on a computer, the computer is enabled to perform the methods in any one of the first aspect and the second aspect or the possible implementations of the first aspect and the second aspect.

According to a ninth aspect, a computer program product including instructions is provided. When the computer program product is run on a computer, the computer is enabled to perform the methods in any one of the first aspect and the second aspect or the possible implementations of the first aspect and the second aspect.

According to a tenth aspect, a communications apparatus is provided, and is configured to perform the methods in any one of the first aspect and the second aspect or the possible implementations of the first aspect and the second aspect.

According to an eleventh aspect, a communications apparatus is provided. The apparatus includes a processor and a memory. The processor is coupled to the memory, the memory is configured to store a computer program, and the processor is configured to execute the computer program stored in the memory, so that the communications apparatus performs the methods in any one of the first aspect and the second aspect or the possible implementations of the first aspect and the second aspect.

According to a twelfth aspect, a communications apparatus is provided. The apparatus includes a processor, a memory, and a transceiver. The memory is configured to store a computer program, and the processor is configured to execute the computer program stored in the memory, so that the apparatus performs the methods in any one of the first aspect and the second aspect or the possible implementations of the first aspect and the second aspect.

According to a thirteenth aspect, a communications apparatus is provided. The communications apparatus includes at least one processor and a communications interface. The communications interface is used by the communications apparatus to exchange information with another communications apparatus, and when program instructions are executed by the at least one processor, the communications apparatus is enabled to implement the methods in any one of the first aspect and the second aspect or the possible implementations of the first aspect and the second aspect.

According to a fourteenth aspect, a processor is provided. The processor includes at least one circuit, configured to perform the methods in any one of the first aspect and the second aspect or the possible implementations of the first aspect and the second aspect.

According to a fifteenth aspect, a chip system is provided. The chip system includes at least one processor, and when program instructions are executed by the at least one processor, the chip system is enabled to implement the methods in any one of the first aspect and the second aspect or the possible implementations of the first aspect and the second aspect.

BRIEF DESCRIPTION OF DRAWINGS

FIG. 6 is a schematic flowchart of a communication method according to an embodiment of this application;

FIG. 9 is a schematic flowchart of a communication method according to an embodiment of this application;

FIG. 10A and FIG. 10B are a schematic flowchart of a communication method according to an embodiment of this application;

DESCRIPTION OF EMBODIMENTS

Figure 1:
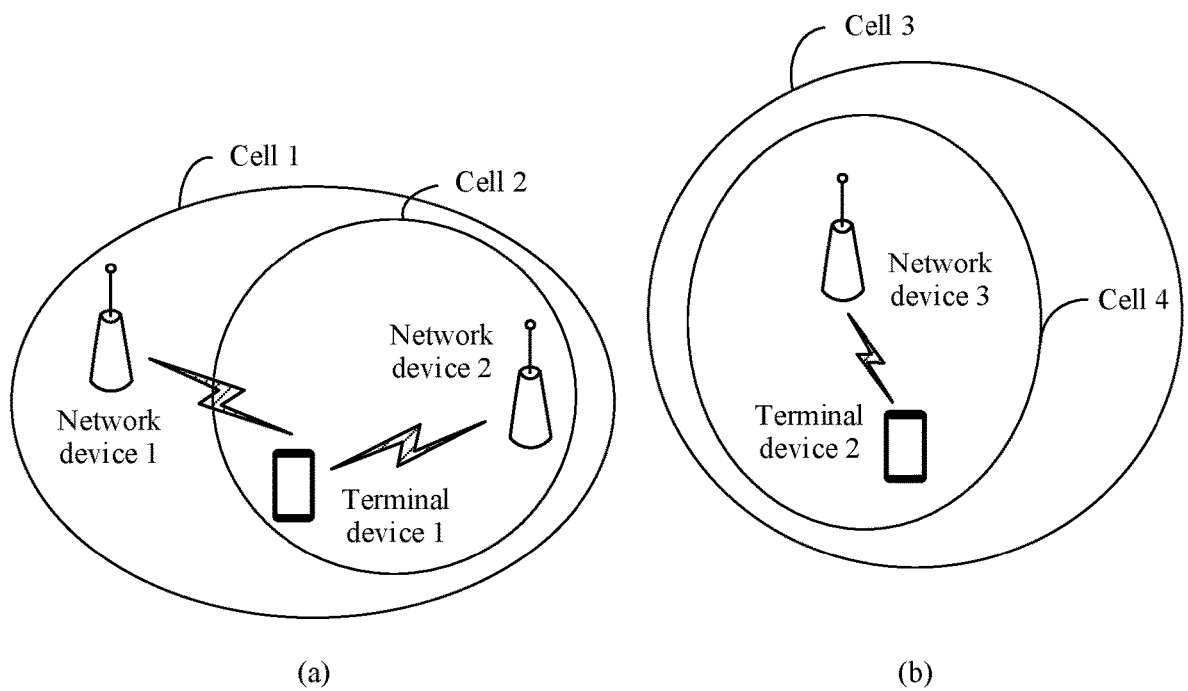
FIG. 1 is a schematic diagram of a communication scenario according to an embodiment of this application.

The following describes technical solutions of this application with reference to accompanying drawings.

The technical solutions in embodiments of this application may be applied to various communication systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A terminal device in embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in embodiments of this application.

A network device in embodiments of this application may be a device configured to communicate with the terminal device. The network device may be a base transceiver station (BTS) in the global system for mobile communications (GSM) or the code division multiple access (CDMA) system, or may be a NodeB (NB) in the wideband code division multiple access (WCDMA) system, or may be an evolved NodeB (eNB or eNodeB) in the LTE system, or may be a radio controller in a cloud radio access network (CRAN) scenario. Alternatively, the network device may be a relay node, an access point, a vehicle-mounted device, a wearable device, a network device in the future 5G network, a network device in the future evolved PLMN, or the like. This is not limited in embodiments of this application.

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more of computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device or the network device, or a function module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

FIG. 1 is a schematic diagram of a communications system according to an embodiment of this application. The communications system shown in FIG. 1 may include at least one terminal device (for example, a terminal device 1 and a terminal device 2) and at least one network device (for example, a network device 1, a network device 2, and a network device 3). The network device is configured to provide a communication service for the terminal device. The terminal device may receive a message sent by the network device, to communicate with the network device.

For example, as shown in (a) in FIG. 1, the terminal device 1 accesses a cell 1 of the network device 1 by using a main network protocol, and accesses a cell 2 of the network device 2 by using a secondary network protocol. The cell 1 may be a primary cell, and therefore a network protocol used by the cell 1 is the main network protocol. The cell 2 may be a secondary cell, and therefore a network protocol used by the cell 2 is the secondary network protocol. The terminal device 2 may communicate with the network device by using both the main network protocol and the secondary network protocol. The terminal device 1 may receive, by using the main network protocol, a message sent by the network device 1. In addition, the terminal device 1 may receive, by using the secondary network protocol, a message sent by the network device 2, or send a message to the network device 2 by using the secondary network protocol. The terminal device 1 may send a message to the network device 1 by using the main network protocol. In addition, the terminal device 1 may receive, by using the secondary network protocol, a message sent by the network device 2, or send a message to the network device 2 by using the secondary network protocol.

For another example, as shown in (b) in FIG. 1, the terminal device 2 accesses a cell 3 of the network device 3 by using a main network protocol, and accesses a cell 4 of the network device 3 by using a secondary network protocol. The cell 3 may be a primary cell, and therefore a network protocol used by the cell 3 is the main network protocol. The cell 4 may be a secondary cell, and therefore a network protocol used by the cell 4 is the secondary network protocol. The terminal device 2 may communicate with the network device by using both the main network protocol and the secondary network protocol. The terminal device 2 may receive, by using the main network protocol, a message sent by the network device 3. In addition, the terminal device 2 may receive, by using the secondary network protocol, a message sent by the network device 3, or send a message to the network device 3 by using the secondary network protocol. The terminal device 2 may send a message to the network device 3 by using the main network protocol. In addition, the terminal device 2 may receive, by using the secondary network protocol, a message sent by the network device 3, or send a message to the network device 3 by using the secondary network protocol.

A scenario in which the terminal device simultaneously uses two different network protocols may also be referred to as multi-RAT dual connectivity (MR-DC). A type of MR-DC mainly includes 4G-5G dual connectivity (E-UTRA NR dual connectivity, EN-DC), 5G-4G dual connectivity (NR E-UTRA Dual Connectivity, NE-DC), and 5G-core network 4G-5G dual connectivity (NG-RAN E-UTRA-NR Dual Connectivity, NGEN-DC). For EN-DC, the terminal device may access a 4G core network, and receive and send messages by using a 4G network protocol and a 5G network protocol. The 4G network protocol is a main network protocol, and the 5G network protocol is a secondary network protocol. For NE-DC, the terminal device may access a 5G core network, and receive and send messages by using a 4G network protocol and a 5G network protocol. The 5G network protocol is a main network protocol, and the 4G network protocol is a secondary network protocol. For NGEN-DC, the terminal device may access a 5G core network, and receive and send messages by using a 4G network protocol and a 5G network protocol. The 4G network protocol is a main network protocol, and the 5G network protocol is a secondary network protocol.

When the terminal device receives and sends messages in a multi-RAT dual-connectivity mode, there are mainly three modes for allocating uplink transmit power: a semi-persistent power sharing-independent power control mode, a semi-persistent power sharing-time division multiplexing (TDM) mode, and a dynamic power sharing mode.

Figure 2:
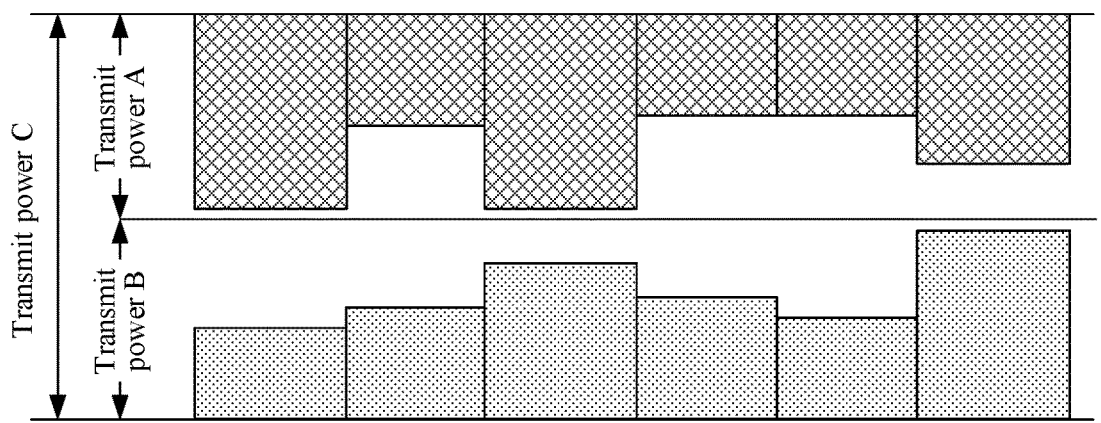
FIG. 2 is a schematic diagram of a semi-persistent power sharing-independent power control mode.

FIG. 2 shows an example of a semi-persistent power sharing-independent power control mode. A rectangular block filled with a slash is used to represent transmit power corresponding to a main network protocol, and a rectangular block filled with a dot matrix is used to represent transmit power corresponding to a secondary network protocol. As specified in a wireless communications protocol, maximum transmit power used to send a message by using both the main network protocol and the secondary network protocol is C. Maximum transmit power corresponding to the main network protocol is A, and maximum transmit power corresponding to the secondary network protocol is B, where $10^{A/10}+10^{B/10} \leq 10^{C/10}$. In a possible scenario, A and B may be the same.

Figure 3:
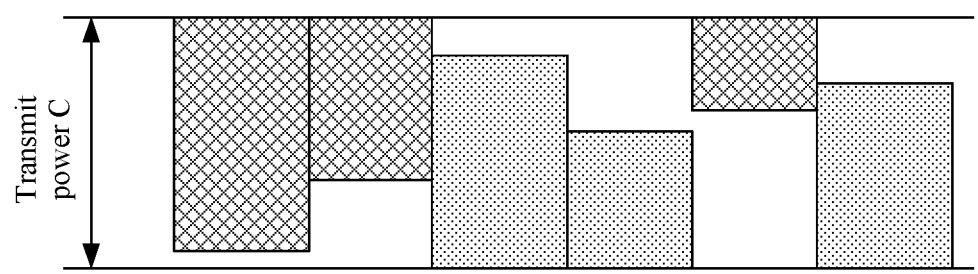
FIG. 3 is a schematic diagram of a semi-persistent power sharing-time division multiplexing (Time Division Multiplexing, TDM) mode.

FIG. 3 shows an example of a semi-persistent power sharing-TDM mode. A rectangular block filled with a slash is used to represent transmit power corresponding to a main network protocol, and a rectangular block filled with a dot matrix is used to represent transmit power corresponding to a secondary network protocol. Within one time unit, a message may be sent by using only the main network protocol or the secondary network protocol. Maximum transmit power corresponding to the main network protocol may be C. Maximum transmit power corresponding to the secondary network protocol may also be C.

Figure 4:
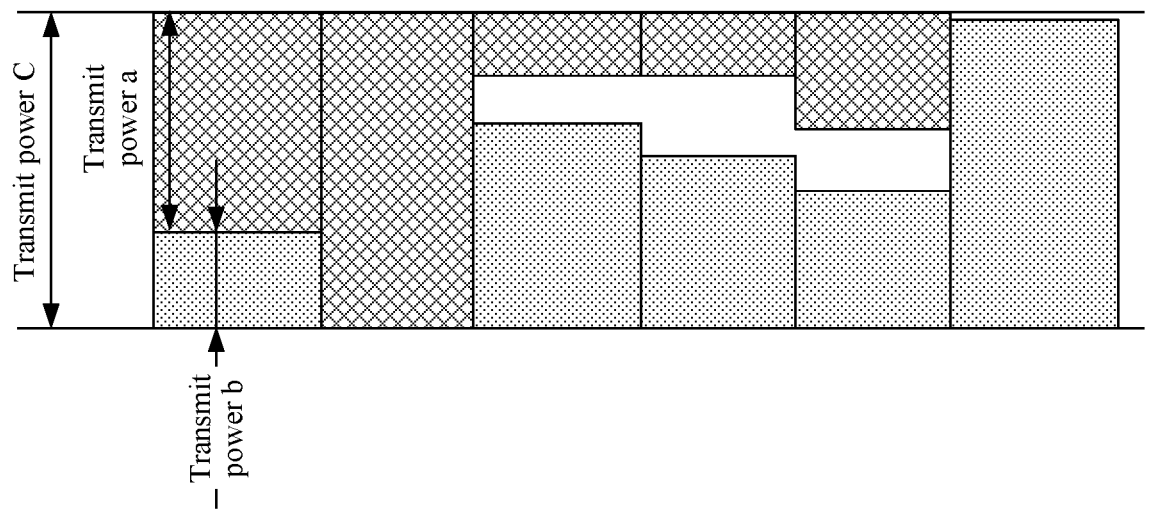
FIG. 4 is a schematic diagram of a dynamic power sharing mode.

FIG. 4 shows an example of a dynamic power sharing mode. A rectangular block filled with a slash is used to represent transmit power corresponding to a main network protocol, and a rectangular block filled with a dot matrix is used to represent transmit power corresponding to a secondary network protocol. As specified in a wireless communications protocol, theoretical maximum transmit power used to send a message by using both the main network protocol and the secondary network protocol is C. Maximum transmit power corresponding to the main network protocol may be C, and maximum transmit power corresponding to the secondary network protocol may be C. Within one time unit, a terminal device sends a message at transmit power a by using the main network protocol, and sends a message at transmit power b by using the secondary network protocol, where $10^{a/10}+10^{b/10} \leq 10^{C/10}$. A priority of the main network protocol is usually higher than a priority of the secondary network protocol. Therefore, when the transmit power corresponding to the main network protocol message is relatively high, the transmit power corresponding to the secondary network protocol message may be reduced, that is, a value of a may be greater than that of b, or even b may be 0. In the power sharing mode shown in FIG. 4, the transmit power corresponding to the secondary network protocol is reduced, so that it can be ensured that a message corresponding to the main network protocol can be successfully sent.

According to a power class 3, a value of C may be 23, and a tolerance may be (+2/−3) dBm. In other words, maximum transmit power actually used by the terminal device to send a message by using both the main network protocol and the secondary network protocol may be from 20 dBm to 25 dBm. A specific value of C is not limited in this application. According to different power classes, C may have different values.

In conclusion, the transmit power corresponding to the secondary network protocol is relatively low, and consequently the terminal device possibly cannot send a message by using the secondary network protocol. Further, if a network device does not receive a message corresponding to the secondary network protocol for a long time, the network device may be disconnected from the terminal device.

Figure 5:
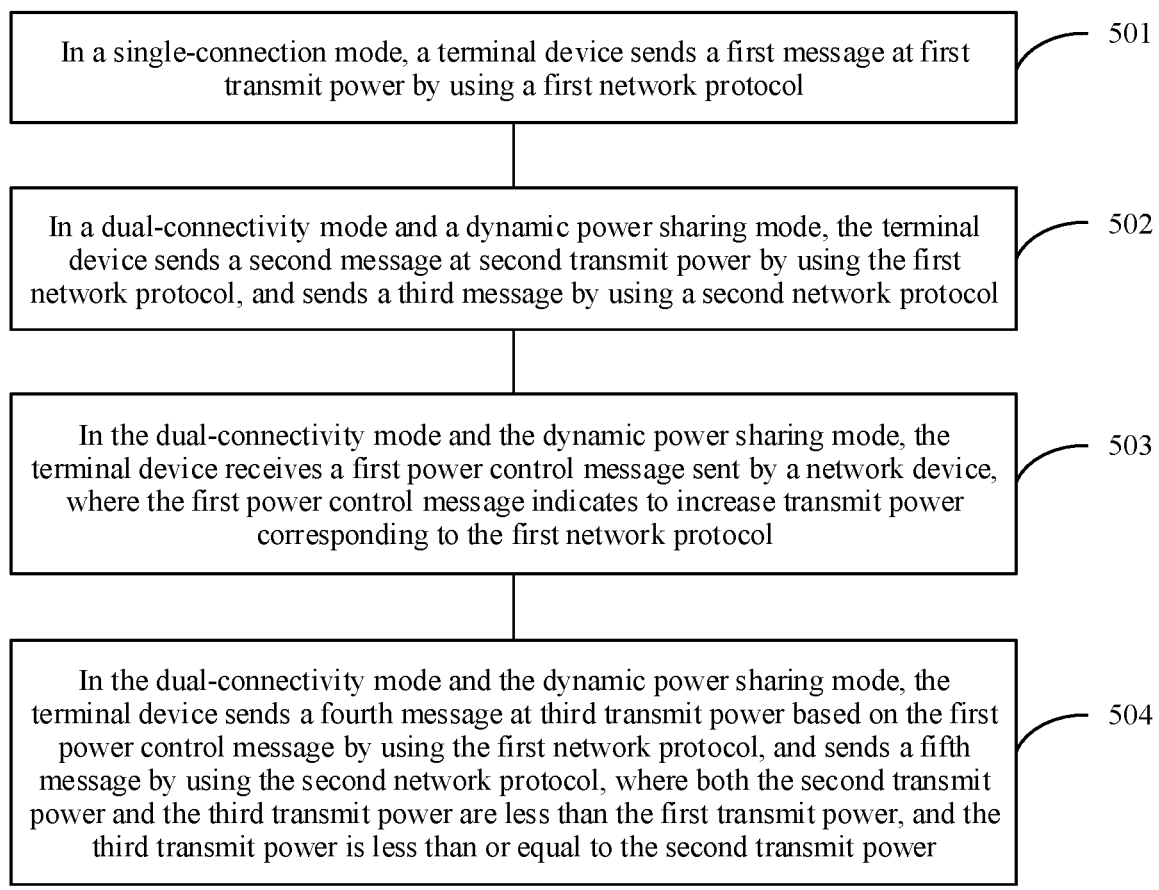
FIG. 5 is a schematic flowchart of a communication method according to an embodiment of this application.

FIG. 5 is a schematic flowchart of a communication method according to an embodiment of this application.

501: In a single-connection mode, a terminal device sends a first message at first transmit power by using a first network protocol.

The single-connection mode may mean that the terminal device receives and sends messages by using only one network protocol. In the single-connection mode, the terminal device may communicate with a network device by using only one network protocol. For example, the terminal device may access a 4G core network, and receive and send messages by using only the 4G network protocol. For another example, the terminal device may access a 5G core network, and receive and send messages by using only the 5G network protocol. The first network protocol may be, for example, a 4G network protocol or a 5G network protocol.

In a sending process, the terminal device may send the first message to a network device 0 at the first transmit power. Correspondingly, the network device 0 may receive the first message sent by the terminal device. In a possible case, if the terminal device moves, a distance between the terminal device and the network device 0 may change, or signal strength, a signal interference degree, or the like around the terminal device may change. If the signal strength increases or the signal interference degree decreases, the terminal device may continue to send a message to the network device 0 at lower transmit power. If the signal strength decreases or the signal interference degree increases, the terminal device may continue to send a message to the network device 0 at higher transmit power. It is assumed that maximum transmit power that can be implemented by the terminal device due to a limitation of a communications protocol is b (in a process of normal communication between the terminal device and the network device, the maximum transmit power b that can be used by the terminal device needs to comply with the communications protocol, and therefore b is limited by the communications protocol). It is assumed that the first transmit power is a. A relationship between the maximum transmit power and the first transmit power needs to meet the following: a≤b. The following uses two examples to explain a relationship between b and the communications protocol, and the relationship between a and b.

For example, it is assumed that the terminal device needs to meet a power class 3, and the power class 3 specifies that theoretical maximum transmit power is 23 dBm and a tolerance is −3 dBm to +2 dBm. Therefore, the maximum transmit power b that can be implemented by the terminal device in a normal working process may be any one of 20 dBm to 25 dBm. In addition, a needs to be less than or equal to b, that is, a maximum value of a may be b. Assuming that b is equal to 25 dBm, a needs to be less than or equal to 25 dBm.

For another example, it is assumed that the terminal device needs to meet a power class 2, and the power class 2 specifies that theoretical maximum transmit power is 26 dBm and a tolerance is −3 dBm to +2 dBm. Therefore, the maximum transmit power b that can be implemented by the terminal device in a normal working process may be any one of 23 dBm to 28 dBm. In addition, a needs to be less than or equal to b, that is, a maximum value of a may be b. Assuming that b is equal to 28 dBm, a needs to be less than or equal to 28 dBm. It can be learned that the maximum transmit power b that can be implemented by the terminal device due to the limitation of the communications protocol is mainly limited by both a capability of the terminal device and the communications protocol.

Optionally, the first transmit power is maximum transmit power used by the terminal device to send a message by using the first network protocol in the single-connection mode.

In other words, the first transmit power may be the same as the maximum transmit power that can be implemented by the terminal device due to the limitation of the communications protocol. Assuming that the maximum transmit power b that can be implemented by the terminal device due to the limitation of the communications protocol is 25 dBm, the first transmit power a may be 25 dBm.

502: In a dual-connectivity mode and a dynamic power sharing mode, the terminal device sends a second message at second transmit power by using the first network protocol, and sends a third message by using a second network protocol, where a time domain resource occupied by the second message at least partially overlaps a time domain resource occupied by the third message, the first network protocol is a main network protocol in the dual-connectivity mode, and the second network protocol is a secondary network protocol in the dual-connectivity mode.

The dual-connectivity mode is different from the single-connection mode. In the dual-connectivity mode, the terminal device may simultaneously receive two messages sent by using the main network protocol and the secondary network protocol, or may simultaneously send two messages to one or more network devices by using the main network protocol and the secondary network protocol. That is, in the dual-connectivity mode, the terminal device may simultaneously communicate with the one or more network devices by using the two network protocols.

Before the terminal device sends the second message and the third message, the terminal device may pack first data by using the first network protocol, to obtain the second message. In addition, the terminal device packs second data by using the second network protocol, to obtain the third message. The terminal device simultaneously sends the second message and the third message, so that the time domain resource occupied by the second message partially or completely overlaps the time domain resource occupied by the third message.

The following uses two examples to describe a manner of communication between the terminal device and the one or more network devices in the dual-connectivity mode.

In an example, the terminal device may send the second message to a network device 1 by using the first network protocol, and the terminal device may send the third message to a network device 2 by using the second network protocol.

The network device 1 may be the same as or different from the network device 0.

In an example, the terminal device may send the second message to a network device 3 by using the first network protocol, and may send the third message to the network device 3 by using the second network protocol.

The network device 3 may be the same as or different from the network device 0.

The following uses three examples to describe specific types of the first network protocol and the second network protocol.

In an example, the type of the dual-connectivity mode is EN-DC. In this case, the first network protocol may be a 4G network protocol, and the second network protocol may be a 5G network protocol.

In an example, the type of the dual-connectivity mode is NE-DC. In this case, the first network protocol may be a 5G network protocol, and the second network protocol may be a 4G network protocol.

In an example, the type of the dual-connectivity mode is NGEN-DC. In this case, the first network protocol may be a 4G network protocol, and the second network protocol may be a 5G network protocol. A difference between NGEN-DC and EN-DC is that a core network of NGEN-DC is 5G, and a core network of EN-DC is 4G.

Because two network protocols are used to separately send two messages, the maximum transmit power that can be implemented by the terminal device due to the limitation of the communications protocol may be used to simultaneously send the second message and the third message. That is, transmit power used to send the second message occupies a first part of the maximum transmit power, and transmit power used to send the third message occupies a second part of the maximum transmit power.

Optionally, that the terminal device sends a third message by using a second network protocol includes: The terminal device sends the third message at fourth transmit power by using the second network protocol.

That is, the terminal device simultaneously sends the second message and the third message, transmit power used to send the second message is the second transmit power, and transmit power used to send the third message is the fourth transmit power. It is assumed that the second transmit power is c, the fourth transmit power is d, and the maximum transmit power that can be implemented by the terminal device due to the limitation of the communications protocol is b. A relationship between the second transmit power, the fourth transmit power, and the maximum transmit power needs to meet the following: $10^{c/10}+10^{d/10} \leq 10^{b/10}$. As described above, it can be learned from the power class 3 that a value of the maximum transmit power b may be any one of 20 dBm to 25 dBm. It can be learned from the power class 2 that a value of the maximum transmit power b may be any one of 23 dBm to 28 dBm.

In an example, it is assumed that the maximum transmit power b is 25 dBm. In this case, a value of the second transmit power c may be, for example, 24 dBm, and the fourth transmit power $d \leq 10*\log_{10}(10^{\wedge}(b/10)-10^{\wedge}(c/10))$ ≈18.1 dBm.

In an example, it is assumed that the maximum transmit power b is 25 dBm. In this case, a value of the second transmit power c may be, for example, 23 dBm, and the fourth transmit power $d \leq 10*\log_{10}(10^{\wedge}(b/10)-10^{\wedge}(c/10))$ ≈20.6 dBm.

In an example, it is assumed that the maximum transmit power b is 25 dBm. In this case, a value of the second transmit power c may be, for example, 21 dBm, and the fourth transmit power $d \leq 10*\log_{10}(10^{\wedge}(b/10)-10^{\wedge}(c/10))$ ≈22.7 dBm.

In an example, it is assumed that the maximum transmit power b is 24 dBm. In this case, a value of the second transmit power c may be, for example, 23 dBm, and the fourth transmit power $d \leq 10*\log_{10}(10^{\wedge}(b/10)-10^{\wedge}(c/10))$ ≈17.1 dBm.

In an example, it is assumed that the maximum transmit power b is 24 dBm. In this case, a value of the second transmit power c may be, for example, 20 dBm, and the fourth transmit power $d \leq 10*\log_{10}(10^{\wedge}(b/10)-10^{\wedge}(c/10))$ ≈21.7 dBm.

In an example, it is assumed that the maximum transmit power b is 28 dBm. In this case, a value of the second transmit power c may be, for example, 25 dBm, and the fourth transmit power $d \leq 10*\log_{10}(10^{\wedge}(b/10)-10^{\wedge}(c/10))$ ≈24.9 dBm.

The foregoing has described the several types of MR-DC, the dynamic power sharing mode, the main network protocol, and the secondary network protocol. Details are not described herein again.

503: In the dual-connectivity mode and the dynamic power sharing mode, the terminal device receives a first power control message sent by a network device, where the first power control message indicates to increase transmit power corresponding to the first network protocol.

In an example, as shown in (a) in FIG. 1, the terminal device accesses the cell 1, and communicates with the network device 1 by using the first network protocol. The terminal device accesses the cell 2, and communicates with the network device 2 by using the second network protocol. The terminal device may move from a center of the cell 2 to an edge of the cell 2, so that signal strength corresponding to the second network protocol decreases, and a signal interference degree corresponding to the second network protocol increases. Therefore, some data that originally needs to be sent by using the second network protocol may be sent by using the first network protocol. To ensure that the network device 1 can accurately receive data sent by using the first network protocol, the network device 1 may send a first power control message to the terminal device, to indicate the terminal device to increase the transmit power corresponding to the first network protocol. In other words, the first power control message may indicate the terminal device to send a message to the network device 1 at transmit power higher than the second transmit power by using the first network protocol. The network device 2 may also indicate the terminal device to increase transmit power corresponding to the second network protocol. Because a priority of the first network protocol is higher, the terminal device originally needs to preferentially increase the transmit power corresponding to the first network protocol. However, the maximum transmit power that can be implemented by the terminal device is limited, and increasing the transmit power corresponding to the first network protocol means that the transmit power corresponding to the second network protocol may be reduced. In other words, a message is sent to the network device 2 at transmit power lower than the fourth transmit power by using the second network protocol. Consequently, communication between the terminal device and the network device 2 is more unfavorable. The network device in step 503 may be the network device 1.

In an example, as shown in (b) in FIG. 1, the terminal device accesses the cell 3, and communicates with the network device 3 by using the first network protocol. The terminal device accesses the cell 4, and communicates with the network device 3 by using the second network protocol. The terminal device may move from a center of the cell 4 to an edge of the cell 4, so that signal strength corresponding to the second network protocol decreases, and a signal interference degree corresponding to the second network protocol increases. Therefore, some data that originally needs to be sent by using the second network protocol may be sent by using the first network protocol. To ensure that the network device 3 can accurately receive data sent by using the first network protocol, the network device 3 may send a first power control message to the terminal device, to indicate the terminal device to increase the transmit power corresponding to the first network protocol. In other words, the first power control message may indicate the terminal device to send a message to the network device 3 at transmit power higher than the second transmit power by using the first network protocol. The network device 3 may also indicate the terminal device to increase transmit power corresponding to the second network protocol. Because a priority of the first network protocol is higher, the terminal device originally needs to preferentially increase the transmit power corresponding to the first network protocol. However, the maximum transmit power that can be implemented by the terminal device due to the limitation of the communications protocol is limited, and increasing the transmit power corresponding to the first network protocol means that the transmit power corresponding to the second network protocol may be reduced. In other words, a message is sent to the network device 2 at transmit power lower than the fourth transmit power by using the second network protocol. Consequently, communication between the terminal device and the cell 4 is more unfavorable. The network device in step 503 may be the network device 3.

504: In the dual-connectivity mode and the dynamic power sharing mode, the terminal device sends a fourth message at third transmit power based on the first power control message by using the first network protocol, and sends a fifth message by using the second network protocol, where a time domain resource occupied by the fourth message at least partially overlaps a time domain resource occupied by the fifth message, both the second transmit power and the third transmit power are less than the first transmit power, and the third transmit power is less than or equal to the second transmit power.

In other words, when the first power control message indicates to increase the transmit power corresponding to the first network protocol, the terminal device does not increase the transmit power corresponding to the first network protocol. Because both the second transmit power and the third transmit power are less than the first transmit power, neither the second transmit power nor the third transmit power reaches the maximum transmit power that can be implemented by the terminal device due to the limitation of the communications protocol. To be specific, in the dual-connectivity mode, the terminal device may simultaneously send a message corresponding to the first network protocol and a message corresponding to the second network protocol, and the terminal device does not send the message corresponding to the first network protocol at the maximum transmit power that can be implemented by the terminal device due to the limitation of the communications protocol, so as to avoid a case in which the transmit power corresponding to the second network protocol is 0 or approximately 0.

Before the terminal device simultaneously sends the fourth message and the fifth message, the terminal device may pack third data by using the first network protocol, to obtain the fourth message. In addition, the terminal device packs fourth data by using the second network protocol, to obtain the fifth message. The terminal device simultaneously sends the fourth message and the fifth message, so that the time domain resource occupied by the fourth message partially or completely overlaps the time domain resource occupied by the fifth message.

In an example, the terminal device may send the fourth message to the foregoing network device 1. The terminal device may send the fifth message to the foregoing network device 2.

In an example, the terminal device may send the fourth message and the fifth message to the foregoing network device 3.

Because two network protocols are used to separately send two messages, the maximum transmit power that can be implemented by the terminal device due to the limitation of the communications protocol may be used to simultaneously send the fourth message and the fifth message. That is, transmit power used to send the fourth message occupies a third part of the maximum transmit power, and transmit power used to send the fifth message occupies a fourth part of the maximum transmit power.

Optionally, that the terminal device sends a fifth message by using the second network protocol includes: The terminal device sends the fifth message at fifth transmit power by using the second network protocol, where the fifth transmit power is greater than or equal to the fourth transmit power.

That is, the terminal device simultaneously sends the fourth message and the fifth message, transmit power used to send the fourth message is the third transmit power, and transmit power used to send the fifth message is the fifth transmit power. It is assumed that the first transmit power in step 501 is a, the maximum transmit power that can be implemented by the terminal device due to the limitation of the communications protocol is b, the second transmit power in step 502 is c, the fourth transmit power in step 502 is d, the third transmit power in step 504 is e, and the fifth transmit power in step 504 is f. Therefore, $10^{e/10}+10^{f/10} \leq 10^{b/10}$, where $e \leq c < a \leq b$. According to priorities of network protocols, the following condition may be met: $f \leq d < b$. This embodiment of this application further provides a case in which the following condition may be met: $d \leq f < b$.

In other words, if the transmit power corresponding to the first network protocol is increased to the second transmit power c, the transmit power corresponding to the first network protocol is not increased. A difference (that is, $10*\log_{10}(10^{\wedge}(b/10)-10^{\wedge}(c/10))$, with a unit of dBm) between the maximum transmit power that can be implemented by the terminal device due to the limitation of the communications protocol and the transmit power corresponding to the first network protocol may be used to send the message corresponding to the second network protocol.

In an example, the second transmit power c is equal to the third transmit power e.

That is, the second transmit power c may be maximum transmit power used by the terminal device to send a message by using the first network protocol in the dual-connectivity mode and the dynamic power sharing mode.

In a possible case, if the fourth transmit power d is less than a difference between the maximum transmit power b and the second transmit power c (that is, $10^{d/10}+10^{c/10}<10^{b/10}$) the fifth transmit power f may be greater than or equal to the fourth transmit power d (that is, $d \leq f$). Therefore, the terminal device may increase the transmit power corresponding to the second network protocol, to ensure that the message corresponding to the second network protocol can be successfully sent.

For example, it is assumed that the maximum transmit power b is 25 dBm. In this case, both a value of the second transmit power c and that of the third transmit power e may be 24 dBm, a value of the fourth transmit power d may be, for example, 17 dBm, and a maximum value of the fifth transmit power f may be, for example, $10*\log_{10}(10^{\wedge}(b/10)-10^{\wedge}(e/10)) \approx 18.1$ dBm.

For example, it is assumed that the maximum transmit power b is 25 dBm. In this case, both a value of the second transmit power c and that of the third transmit power e may be 23 dBm, a value of the fourth transmit power d may be, for example, 19 dBm, and a maximum value of the fifth transmit power f may be, for example, $10*\log_{10}(10^{\wedge}(b/10)-10^{\wedge}(e/10)) \approx 20.6$ dBm.

For example, it is assumed that the maximum transmit power b is 25 dBm. In this case, both a value of the second transmit power c and that of the third transmit power e may be 21 dBm, a value of the fourth transmit power d may be, for example, 20 dBm, and a maximum value of the fifth transmit power f may be, for example, $10*\log_{10}(10^{\wedge}(b/10)-10^{\wedge}(e/10)) \approx 22.7$ dBm.

For example, it is assumed that the maximum transmit power b is 24 dBm. In this case, both a value of the second transmit power c and that of the third transmit power e may be 23 dBm, a value of the fourth transmit power d may be, for example, 16 dBm, and a maximum value of the fifth transmit power f may be, for example, $10*\log_{10}(10^{\wedge}(b/10)-10^{\wedge}(e/10)) \approx 17.1$ dBm.

For example, it is assumed that the maximum transmit power b is 24 dBm. In this case, both a value of the second transmit power c and that of the third transmit power e may be 20 dBm, a value of the fourth transmit power d may be, for example, 18 dBm, and a maximum value of the fifth transmit power f may be, for example, $10*\log_{10}(10^{\wedge}(b/10)-10^{\wedge}(e/10)) \approx 21.7$ dBm.

For example, it is assumed that the maximum transmit power b is 28 dBm. In this case, both a value of the second transmit power c and that of the third transmit power e may be 25 dBm, a value of the fourth transmit power d may be, for example, 23 dBm, and a maximum value of the fifth transmit power f may be, for example, $10*\log_{10}(10^{\wedge}(b/10)-10^{\wedge}(e/10)) \approx 24.9$ dBm.

In a possible case, if the fourth transmit power d is equal to a difference between the maximum transmit power b and the second transmit power c (that is, $10^{d/10}+10^{c/10}=10^{b/10}$) the fifth transmit power f may be equal to the fourth transmit power d (that is, f=d). In this case, the fourth transmit power d may be maximum transmit power used by the terminal device to send the message corresponding to the second network protocol.

For example, it is assumed that the maximum transmit power b is 25 dBm. In this case, both a value of the second transmit power c and that of the third transmit power e may be 24 dBm, and both a maximum value of the fourth transmit power d and that of the fifth transmit power f may be $10*\log_{10}(10^{\wedge}(b/10)-10^{\wedge}(e/10)) \approx 18.1$ dBm.

For example, it is assumed that the maximum transmit power b is 25 dBm. In this case, both a value of the second transmit power c and that of the third transmit power e may be 23 dBm, and both a maximum value of the fourth transmit power d and that of the fifth transmit power f may be $10*\log_{10}(10^{\wedge}(b/10)-10^{\wedge}(e/10)) \approx 20.6$ dBm.

For example, it is assumed that the maximum transmit power b is 25 dBm. In this case, both a value of the second transmit power c and that of the third transmit power e may be 21 dBm, and both a maximum value of the fourth transmit power d and that of the fifth transmit power f may be $10*\log_{10}(10^{\wedge}(b/10)-10^{\wedge}(e/10)) \approx 22.7$ dBm.

For example, it is assumed that the maximum transmit power b is 24 dBm. In this case, both a value of the second transmit power c and that of the third transmit power e may be 23 dBm, and both a maximum value of the fourth transmit power d and that of the fifth transmit power f may be $10*\log_{10}(10^{\wedge}(b/10)-10^{\wedge}(e/10))\approx17.1$ dBm.

For example, it is assumed that the maximum transmit power b is 24 dBm. In this case, both a value of the second transmit power c and that of the third transmit power e may be 20 dBm, and both a maximum value of the fourth transmit power d and that of the fifth transmit power f may be $10*\log_{10}(10^{\wedge}(b/10)-10^{\wedge}(e/10))\approx21.7$ dBm.

For example, it is assumed that the maximum transmit power b is 28 dBm. In this case, both a value of the second transmit power c and that of the third transmit power e may be 25 dBm, and both a maximum value of the fourth transmit power d and that of the fifth transmit power f may be $10*\log_{10}(10^{\wedge}(b/10)-10^{\wedge}(e/10))\approx24.9$ dBm.

In an example, the second transmit power c is less than the third transmit power e.

In other words, the terminal device may actively reduce the transmit power corresponding to the first network protocol, to increase the transmit power corresponding to the second network protocol.

For example, it is assumed that the maximum transmit power b is 25 dBm. In this case, a value of the second transmit power c may be 24 dBm, and a maximum value of the fourth transmit power d may be $10*\log_{10}(10^{\wedge}(b/10)-10^{\wedge}(c/10))\approx18.1$ dBm. In this case, a value of the third transmit power e may be 23 dBm, and a maximum value of the fifth transmit power f may be $10*\log_{10}(10^{\wedge}(b/10)-10^{\wedge}(e/10))\approx20.6$ dBm.

For example, it is assumed that the maximum transmit power b is 25 dBm. In this case, a value of the second transmit power c may be 23 dBm, and a maximum value of the fourth transmit power d may be $10*\log_{10}(10^{\wedge}(b/10)-10^{\wedge}(c/10))\approx20.6$ dBm. In this case, a value of the third transmit power e may be 22 dBm, and a maximum value of the fifth transmit power f may be $10*\log_{10}(10^{\wedge}(b/10)-10^{\wedge}(e/10))\approx21.9$ dBm.

For example, it is assumed that the maximum transmit power b is 24 dBm. In this case, a value of the second transmit power c may be 23 dBm, and a maximum value of the fourth transmit power d may be $10*\log_{10}(10^{\wedge}(b/10)-10^{\wedge}(c/10))\approx17.1$ dBm. In this case, a value of the third transmit power e may be 22 dBm, and a maximum value of the fifth transmit power f may be $10*\log_{10}(10^{\wedge}(b/10)-10^{\wedge}(e/10))\approx19.6$ dBm.

For example, it is assumed that the maximum transmit power b is 24 dBm. In this case, a value of the second transmit power c may be 23 dBm, and a maximum value of the fourth transmit power d may be $10*\log_{10}(10^{\wedge}(b/10)-10^{\wedge}(c/10))\approx17.1$ dBm. In this case, a value of the third transmit power e may be 20 dBm, and a maximum value of the fifth transmit power f may be $10*\log_{10}(10^{\wedge}(b/10)-10^{\wedge}(e/10))\approx21.7$ dBm.

For example, it is assumed that the maximum transmit power b is 28 dBm. In this case, a value of the second transmit power c may be 25 dBm, and a maximum value of the fourth transmit power d may be $10*\log_{10}(10^{\wedge}(b/10)-10^{\wedge}(c/10))\approx24.9$ dBm. In this case, a value of the third transmit power e may be 24 dBm, and a maximum value of the fifth transmit power f may be $10*\log_{10}(10^{\wedge}(b/10)-10^{\wedge}(e/10))\approx25.7$ dBm.

Optionally, before the terminal device sends the fifth message at the fifth transmit power by using the second network protocol, the method further includes: In the dual-connectivity mode and the dynamic power sharing mode, the terminal device receives a second power control message sent by the network device, where the second power control message indicates to increase transmit power corresponding to the second network protocol. In the dual-connectivity mode and the dynamic power sharing mode, the terminal device determines, based on the second power control message, target preset transmit power used to send the fifth message, where a difference between the target preset transmit power and the fifth transmit power is less than or equal to a first preset threshold.

The terminal device may determine, based on the power control message sent by the network device, that transmit power 1 needs to be used to send the message 1, that is, the target preset transmit power is the transmit power 1. The terminal device also sends the message corresponding to the main network protocol. Therefore, to ensure that total transmit power does not exceed a protocol range, the terminal device may slightly reduce the transmit power corresponding to the secondary network protocol, that is, send the message 1 at transmit power 2 by using the secondary network protocol. If a difference between the transmit power 1 and the transmit power 2 is excessively large (the difference between the transmit power 1 and the transmit power 2 is greater than the first preset threshold), the terminal device may send the message 1 at excessively low transmit power. Therefore, a probability of successfully sending the message 1 is relatively low. In a possible case, the terminal device determines whether the difference between the transmit power 1 and the transmit power 2 is greater than the first preset threshold. If yes, the terminal device may give up sending the message 1, to reduce an energy consumption loss. Therefore, by decreasing the transmit power corresponding to the main network protocol, the transmit power corresponding to the secondary network protocol may be increased, so that a difference between the target preset transmit power configured by the network device and the fifth transmit power actually used by the terminal device is less than or equal to the first preset threshold. This ensures that the terminal device does not give up sending the message corresponding to the secondary network protocol.

For example, the first preset threshold may be obtained by receiving radio resource control (RRC) information sent by the network device, and the RRC information may indicate the first preset threshold.

The first preset threshold may be, for example, 3 dBm or 6 dBm.

In an example, the first preset threshold is 3 dBm.

For example, the maximum transmit power that can be reached by the terminal device due to the limitation of the communications protocol is 25 dBm, and the terminal device prepares to simultaneously send the message corresponding to the main network protocol and the message corresponding to the secondary network protocol. The terminal device may determine, based on the power control message sent by the network device, that preset transmit power corresponding to the secondary network protocol is 22 dBm. In a possible case, assuming that actual transmit power corresponding to the main network protocol is 24 dBm, maximum transmit power that can be actually used by the terminal device and that corresponds to the secondary network protocol may be $10*\log_{10}(10^{\wedge}(25/10)-10^{\wedge}(24/10))\approx18.1$ dBm, and the terminal device may give up sending the message corresponding to the secondary network protocol. In another possible case, assuming that actual transmit power corresponding to the main network protocol is 23 dBm, maximum transmit power that can be actually used by the terminal device and that corresponds to the secondary network protocol may be $10*\log_{10}(10^{\wedge}(25/10)-10^{\wedge}(23/10))\approx20.6$ dBm. Therefore, the terminal device may simultaneously send the message corresponding to the main network protocol and the message corresponding to the secondary network protocol. Actually, the preset transmit power corresponding to the secondary network protocol may be increased to at least about 23.6 dBm. Therefore, a quantity of messages that can be sent by the terminal device and that corresponds to the secondary network protocol may be increased.

For another example, the maximum transmit power that can be reached by the terminal device due to the limitation of the communications protocol is 28 dBm, and the terminal device prepares to simultaneously send the message corresponding to the main network protocol and the message corresponding to the secondary network protocol. The terminal device may determine, based on the power control message sent by the network device, that preset transmit power corresponding to the secondary network protocol is 25 dBm. In a possible case, assuming that actual transmit power corresponding to the main network protocol is 27 dBm, maximum transmit power that can be actually used by the terminal device and that corresponds to the secondary network protocol may be $10*\log_{10}(10^{\wedge}(28/10)-10^{\wedge}(27/10))$ ≈21.1 dBm, and the terminal device may give up sending the message corresponding to the secondary network protocol. In another possible case, assuming that actual transmit power corresponding to the main network protocol is 26 dBm, maximum transmit power that can be actually used by the terminal device and that corresponds to the secondary network protocol may be $10*\log_{10}(10^{\wedge}(28/10)-10^{\wedge}(26/10))$ ≈23.6 dBm. Therefore, the terminal device may simultaneously send the message corresponding to the main network protocol and the message corresponding to the secondary network protocol. Actually, the preset transmit power corresponding to the secondary network protocol may be increased to at least about 26.6 dBm. Therefore, a quantity of messages that can be sent by the terminal device and that corresponds to the secondary network protocol may be increased.

In an example, the first preset threshold is 6 dBm.

For example, the maximum transmit power that can be reached by the terminal device due to the limitation of the communications protocol is 25 dBm, and the terminal device prepares to simultaneously send the message corresponding to the main network protocol and the message corresponding to the secondary network protocol. The terminal device may determine, based on the power control message sent by the network device, that preset transmit power corresponding to the secondary network protocol is 24.2 dBm. In a possible case, assuming that actual transmit power corresponding to the main network protocol is 24 dBm, maximum transmit power that can be actually used by the terminal device and that corresponds to the secondary network protocol may be $10*\log_{10}(10^{\wedge}(25/10)-10^{\wedge}(24/10))$ ≈18.1 dBm, and the terminal device may give up sending the message corresponding to the secondary network protocol. In another possible case, assuming that actual transmit power corresponding to the main network protocol is 23 dBm, maximum transmit power that can be actually used by the terminal device and that corresponds to the secondary network protocol may be $10*\log_{10}(10^{\wedge}(25/10)-10^{\wedge}(23/10))$ ≈20.6 dBm. Therefore, the terminal device may simultaneously send the message corresponding to the main network protocol and the message corresponding to the secondary network protocol. Actually, the preset transmit power corresponding to the secondary network protocol may be increased to at least 25 dBm (and therefore cannot be increased to 20.6+6, that is, 26.6 dBm due to the limitation of the communications protocol). Therefore, a quantity of messages that can be sent by the terminal device and that corresponds to the secondary network protocol may be increased.

For another example, the maximum transmit power that can be reached by the terminal device due to the limitation of the communications protocol is 28 dBm, and the terminal device prepares to simultaneously send the message corresponding to the main network protocol and the message corresponding to the secondary network protocol. The terminal device may determine, based on the power control message sent by the network device, that preset transmit power corresponding to the secondary network protocol is 27.2 dBm. In a possible case, assuming that actual transmit power corresponding to the main network protocol is 27 dBm, maximum transmit power that can be actually used by the terminal device and that corresponds to the secondary network protocol may be $10*\log_{10}(10^{\wedge}(28/10)-10^{\wedge}(27/10))$ ≈21.1 dBm, and the terminal device may give up sending the message corresponding to the secondary network protocol. In another possible case, assuming that actual transmit power corresponding to the main network protocol is 26 dBm, maximum transmit power that can be actually used by the terminal device and that corresponds to the secondary network protocol may be $10*\log_{10}(10^{\wedge}(28/10)-10^{\wedge}(26/10))$ ≈23.6 dBm. Therefore, the terminal device may simultaneously send the message corresponding to the main network protocol and the message corresponding to the secondary network protocol. Actually, the preset transmit power corresponding to the secondary network protocol may be increased to at least 28 dBm (and therefore cannot be increased to 23.6+6, that is, 29.6 dBm due to the limitation of the communications protocol). Therefore, a quantity of messages that can be sent by the terminal device and that corresponds to the secondary network protocol may be increased.

Optionally, the method further includes: In the dual-connectivity mode and the dynamic power sharing mode, the terminal device sends a tenth message at eighth transmit power by using the first network protocol. In the dual-connectivity mode and the dynamic power sharing mode, the terminal device receives a fourth power control message sent by the network device, where the fourth power control message indicates to increase the transmit power corresponding to the first network protocol. In the dual-connectivity mode and the dynamic power sharing mode, the terminal device sends an eleventh message at ninth transmit power based on the fourth power control message by using the first network protocol. The eighth transmit power is less than the ninth transmit power, the ninth transmit power is less than a second preset threshold, and the second transmit power is greater than or equal to the second preset threshold.

In other words, when the transmit power corresponding to the first network protocol is less than the second preset threshold, the terminal device may increase, based on the power control message sent by the network device, the transmit power corresponding to the first network protocol (that is, the eighth transmit power is less than the ninth transmit power, and the ninth transmit power is less than the second preset threshold). When the transmit power corresponding to the first network protocol is greater than or equal to the second preset threshold (that is, the second transmit power is greater than or equal to the second preset threshold), the transmit power corresponding to the first network protocol has been increased to a relatively high level, and the terminal device may no longer continue to increase the transmit power corresponding to the first network protocol.

Therefore, it can be ensured that the transmit power corresponding to the second network protocol is not excessively low.

For example, the second preset threshold is 23 dBm. The terminal device simultaneously sends a message 1 and a message 2. The message 1 is sent by using the first network protocol, and transmit power for sending the message 1 is 17 dBm. The message 2 is sent by using the second network protocol, and transmit power for sending the message 2 is 17 dBm. A time domain resource occupied by the message 1 at least partially overlaps a time domain resource occupied by the message 2. If the terminal device receives the fourth power control message, the terminal device may increase the transmit power corresponding to the first network protocol. In a next message sending process, the terminal device simultaneously sends a message 3 and a message 4. The message 3 is sent by using the first network protocol, and transmit power for sending the message 3 may be 23 dBm. The message 4 is sent by using the second network protocol, and transmit power for sending the message 4 may be 17 dBm. Then, the terminal device receives the first power control message sent by the network device. Because the transmit power corresponding to the first network protocol is equal to the second preset threshold, the terminal device may not increase the transmit power corresponding to the first network protocol based on the first power control message, so as to ensure that the transmit power corresponding to the second network protocol is greater than or equal to 17 dBm.

Optionally, the second preset threshold is theoretical maximum transmit power configured in a power class, and the dual-connectivity mode meets the power class.

Optionally, the power class is a power class 3.

Using the power class 3 as an example, theoretical maximum transmit power configured in the power class is 23 dBm, and a tolerance is +2/−3 dBm. Therefore, in the dual-connectivity mode, the terminal device may send a message at maximum transmit power of 20 dBm to 25 dBm by using the first network protocol. The terminal device may send a message at maximum transmit power of 20 dBm to 25 dBm by using the second network protocol. Therefore, the second preset threshold is the theoretical maximum transmit power configured in the power class, so that it can be ensured that the transmit power corresponding to the second network protocol is not excessively low while a communications protocol standard is met.

It should be understood that the dual-connectivity mode may further support another power class. The second preset threshold may support different power classes. Therefore, a specific value of the second preset threshold is not limited in this application.

Optionally, the fifth message includes uplink control information.

The uplink control information affects receiving of downlink data. Therefore, if the terminal device cannot send the uplink control information by using the secondary network protocol, receiving of the downlink data by the terminal device by using the secondary network protocol is affected, and consequently user experience of the terminal device is affected. Therefore, when the terminal device needs to send the uplink control information by using the second network protocol, in other words, when the fifth message includes the uplink control information, the transmit power corresponding to the first network protocol is not increased but decreased, so that the terminal device can increase the transmit power corresponding to the second network protocol. This ensures that the terminal device can send the uplink control information by using the secondary network protocol while sending an uplink message by using the main network protocol, to help the terminal device receive the downlink data by using the secondary network protocol.

Optionally, before the terminal device sends the second message at the second transmit power by using the first network protocol, and sends the third message by using the second network protocol, the method further includes: The terminal device sends first indication information to the network device, where the first indication information indicates that the terminal device supports the dynamic power sharing mode.

In other words, the terminal device may report the first indication information to the network device, so that the network device can determine that the terminal device supports the dynamic power sharing mode. Further, in the dual-connectivity mode, the network device may send a power control message to the terminal device, to control the terminal device to adjust transmit power according to the dynamic power sharing mode.

Optionally, a value of the second transmit power is determined based on a service type corresponding to the second message.

That a message corresponds to a service type may indicate that the message includes information about the service type. The service type may include a voice over long term evolution (voice over long term evolution, VoLTE) service, a web browsing service, a video play service, a video call service, and the like. Specific priorities of various services may not be limited in this application.

Optionally, both the second message and the fourth message correspond to a first service type, and before the sending a fourth message at third transmit power based on the first power control message by using the first network protocol, the method further includes: determining the third transmit power based on the first service type and the first power control message.

In other words, the terminal device may determine, based on the service type of the second message and the service type of the fourth message, whether the transmit power needs to be further increased based on the second transmit power. The following uses an example for detailed description.

There are a service type A and a service type B. A priority of the service type A is higher than that of the service type B. Therefore, maximum transmit power corresponding to the service type A may be slightly higher than maximum transmit power corresponding to the service type B. For example, the maximum transmit power corresponding to the service type A may be 25 dB, and the maximum transmit power corresponding to the service type B may be 23 dBm. If the second message and the fourth message correspond to the service type A, because the third transmit power is less than or equal to the second transmit power, the second transmit power may be approximately 25 dBm. If the second message and the fourth message correspond to the service type B, because the third transmit power is less than or equal to the second transmit power, the second transmit power is approximately 23 dBm. The service type A may be, for example, a VoLTE service. The service type B may be, for example, a web browsing service.

FIG. 6 shows a method for determining transmit power corresponding to a main network protocol according to an embodiment of this application.

601: In a single-connection mode, a terminal device sends a first message at first transmit power by using a first network protocol.

602: In a dual-connectivity mode and a dynamic power sharing mode, the terminal device sends a second message at second transmit power by using the first network protocol, and sends a third message by using a second network protocol, where a time domain resource occupied by the second message at least partially overlaps a time domain resource occupied by the third message, the first network protocol is a main network protocol in the dual-connectivity mode, and the second network protocol is a secondary network protocol in the dual-connectivity mode.

603: In the dual-connectivity mode and the dynamic power sharing mode, the terminal device receives a first power control message sent by a network device, where the first power control message indicates to increase transmit power corresponding to the first network protocol.

604: In the dual-connectivity mode and the dynamic power sharing mode, the terminal device sends a fourth message at third transmit power based on the first power control message by using the first network protocol, and sends a fifth message by using the second network protocol, where a time domain resource occupied by the fourth message at least partially overlaps a time domain resource occupied by the fifth message, both the second transmit power and the third transmit power are less than the first transmit power, the third transmit power is less than or equal to the second transmit power, and both the second message and the fourth message correspond to a first service type.

For specific implementations of step 601 to step 604, refer to step 501 to step 504 in the embodiment shown in FIG. 5. Details are not described herein again.

605: In the dual-connectivity mode and the dynamic power sharing mode, the terminal device sends a sixth message at sixth transmit power by using the first network protocol, and sends a seventh message by using the second network protocol, where a time domain resource occupied by the sixth message at least partially overlaps a time domain resource occupied by the seventh message, and the sixth message corresponds to a second service type.

606: In the dual-connectivity mode and the dynamic power sharing mode, the terminal device receives a third power control message sent by the network device, where the third power control message indicates to increase the transmit power corresponding to the first network protocol.

607: In the dual-connectivity mode and the dynamic power sharing mode, the terminal device sends an eighth message at seventh transmit power based on the third power control message by using the first network protocol, and sends a ninth message by using the second network protocol, where a time domain resource occupied by the eighth message at least partially overlaps a time domain resource occupied by the ninth message, the eighth message corresponds to the second service type, the sixth transmit power is less than the second transmit power, and the seventh transmit power is less than or equal to the sixth transmit power, where when a priority of the first service type is higher than a priority of the second service type, the sixth transmit power is less than the second transmit power; or when the priority of the first service type is lower than the priority of the second service type, the sixth transmit power is greater than the second transmit power.

In other words, when the terminal device sends messages of different services, the terminal device may use different maximum transmit power. The following uses an example for detailed description.

There are a service type A, a service type B, and a service type C. A priority of the service type A is higher than that of the service type B, and the priority of the service type B is higher than that of the service C. Therefore, maximum transmit power corresponding to the service type A may be slightly higher than maximum transmit power corresponding to the service type B. The maximum transmit power corresponding to the service type B may be slightly higher than maximum transmit power corresponding to the service type C. For example, the maximum transmit power corresponding to the service type A may be 25 dBm, the maximum transmit power corresponding to the service type B may be 23 dBm, and the maximum transmit power corresponding to the service type B may be 22 dBm. It is assumed that the second message and the fourth message correspond to the service type B. Therefore, a maximum value of the second transmit power may be 23 dBm. In a possible case, both the sixth message and the eighth message correspond to the service type A. Therefore, a maximum value of the sixth transmit power may be 25 dBm (that is, higher than the second transmit power). In a possible case, both the sixth message and the eighth message correspond to the service type C. Therefore, a maximum value of the sixth transmit power may be 22 dBm (that is, lower than the second transmit power). The service type A may be, for example, a voice over long term evolution (voice over long term evolution, VoLTE) service. The service type B may be, for example, a video call service. The service type C may be, for example, a web browsing service.

Figure 7:
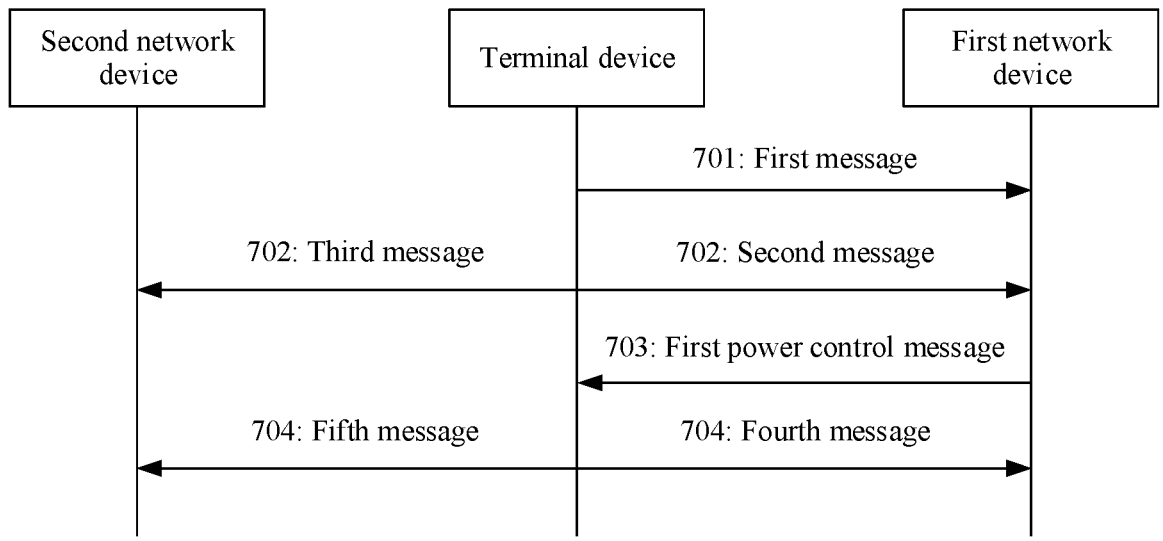
FIG. 7 is a schematic flowchart of a communication method according to an embodiment of this application.

With reference to (a) in FIG. 1, FIG. 7 shows a process of interaction between a terminal device and a plurality of network devices.

701: In a single-connection mode, a terminal device sends a first message to a first network device at first transmit power by using a first network protocol.

702: In a dual-connectivity mode and a dynamic power sharing mode, the terminal device sends a second message to the first network device at second transmit power by using the first network protocol, and sends a third message to a second network device by using a second network protocol, where a time domain resource occupied by the second message at least partially overlaps a time domain resource occupied by the third message, the first network protocol is a main network protocol in the dual-connectivity mode, and the second network protocol is a secondary network protocol in the dual-connectivity mode.

703: In the dual-connectivity mode and the dynamic power sharing mode, the terminal device receives a first power control message sent by the first network device, where the first power control message indicates to increase transmit power corresponding to the first network protocol.

704: In the dual-connectivity mode and the dynamic power sharing mode, the terminal device sends a fourth message to the first network device at third transmit power based on the first power control message by using the first network protocol, and sends a fifth message to the second network device by using the second network protocol, where a time domain resource occupied by the fourth message at least partially overlaps a time domain resource occupied by the fifth message, both the second transmit power and the third transmit power are less than the first transmit power, and the third transmit power is less than or equal to the second transmit power.

For specific implementations of step 701 to step 704, refer to step 501 to step 504 in the embodiment shown in FIG. 5. Details are not described herein again.

Figure 8:
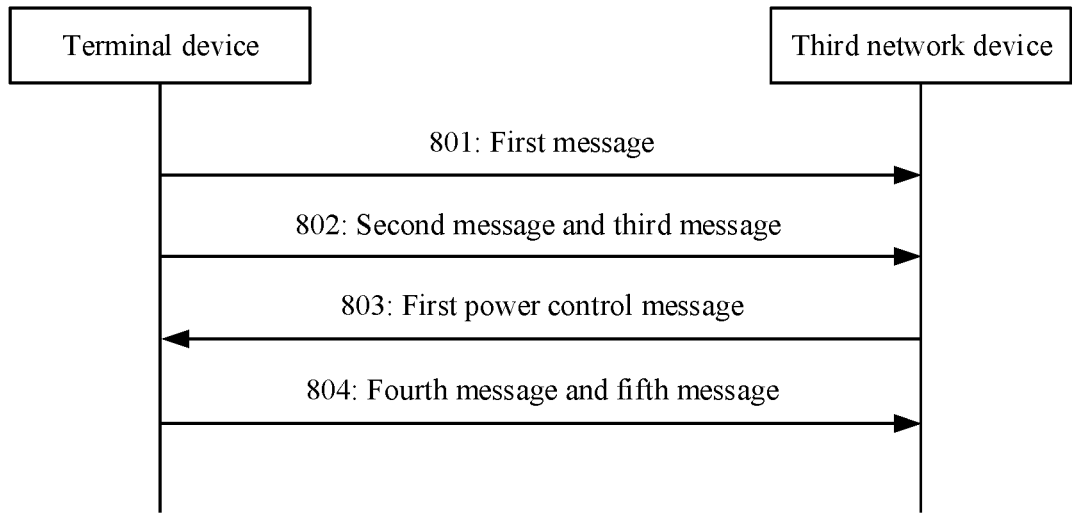
FIG. 8 is a schematic flowchart of a communication method according to an embodiment of this application.

With reference to (b) in FIG. 1, FIG. 8 shows a process of interaction between a terminal device and one network device.

801: In a single-connection mode, a terminal device sends a first message to a third network device at first transmit power by using a first network protocol.

802: In a dual-connectivity mode and a dynamic power sharing mode, the terminal device sends a second message to the third network device at second transmit power by using the first network protocol, and sends a third message to the third network device by using a second network protocol, where a time domain resource occupied by the second message at least partially overlaps a time domain resource occupied by the third message, the first network protocol is a main network protocol in the dual-connectivity mode, and the second network protocol is a secondary network protocol in the dual-connectivity mode.

803: In the dual-connectivity mode and the dynamic power sharing mode, the terminal device receives a first power control message sent by the third network device, where the first power control message indicates to increase transmit power corresponding to the first network protocol.

804: In the dual-connectivity mode and the dynamic power sharing mode, the terminal device sends a fourth message to the third network device at third transmit power based on the first power control message by using the first network protocol, and sends a fifth message to the third network device by using the second network protocol, where a time domain resource occupied by the fourth message at least partially overlaps a time domain resource occupied by the fifth message, both the second transmit power and the third transmit power are less than the first transmit power, and the third transmit power is less than or equal to the second transmit power.

For specific implementations of step 801 to step 804, refer to step 501 to step 504 in the embodiment shown in FIG. 5. Details are not described herein again.

FIG. 9 is a schematic flowchart of a communication method according to an embodiment of this application.

901: A terminal device sends second indication information to a network device, where the second indication information indicates that a semi-persistent power sharing mode is supported in a dual-connectivity mode.

The semi-persistent power sharing mode is a power sharing mode in the dual-connectivity mode. The terminal device may report, to the network device, the fact that the terminal device supports the semi-persistent power sharing mode, so that the network device can control transmit power of the terminal device based on the semi-persistent power sharing mode.

The foregoing has described the several types of MR-DC and the semi-persistent power sharing mode. Details are not described herein again.

902: The terminal device obtains theoretical maximum transmit power in the dual-connectivity mode and the semi-persistent power sharing mode, where the theoretical maximum transmit power corresponds to a main network protocol in the dual-connectivity mode.

In an example, the terminal device may receive third indication information sent by the network device, where the third indication information indicates the theoretical maximum transmit power corresponding to the main network protocol in the semi-persistent power sharing mode.

The terminal device may simultaneously send two messages by using two network protocols. The network device may determine, based on a power class specified in a communications protocol, theoretical maximum transmit power that can be implemented by the terminal device. In the semi-persistent power sharing mode, the network device provides third indication information, to indicate the theoretical maximum transmit power corresponding to the main network protocol to the terminal device. The remaining part, except the theoretical maximum transmit power corresponding to the main network protocol, in the theoretical maximum transmit power that can be implemented by the terminal device may represent theoretical maximum transmit power corresponding to the secondary network protocol in the dual-connectivity mode. Correspondingly, the terminal device may determine, based on theoretical maximum transmit power configured by the network device, actual maximum transmit power corresponding to the main network protocol (that is, maximum transmit power actually used to send a message corresponding to the main network protocol), and actual maximum transmit power corresponding to the secondary network protocol (that is, maximum transmit power actually used to send a message corresponding to the secondary network protocol).

In an example, if the terminal device does not receive the third indication information sent by the network device, the terminal device may use a default power class, for example, a power class 3.

It is assumed that theoretical maximum transmit power configured in a power class is C, theoretical maximum transmit power configured by the network device and corresponding to the main network protocol is A, and theoretical maximum transmit power configured by the network device and corresponding to the secondary network protocol is B. Therefore, $10^{A/10}+10^{B/10}=10^{C/10}$.

Using the power class 3 as an example, theoretical maximum transmit power configured in the power class is 23 dBm, and a tolerance is +2/−3 dBm. Therefore, the theoretical maximum transmit power C is 23 dBm. Maximum transmit power that can be implemented by the terminal device due to a limitation of the communications protocol is from 20 dBm and 25 dBm. In this case, values of the theoretical maximum transmit power A and the theoretical maximum transmit power B may both be, for example, 20 dBm.

903: In the dual-connectivity mode and the semi-persistent power sharing mode, the terminal device sends a twelfth message at twelfth transmit power by using the main network protocol, and sends a thirteenth message at thirteenth transmit power by using a secondary network protocol in the dual-connectivity mode, where the twelfth transmit power is less than or equal to the theoretical maximum transmit power.

Before the terminal device sends the twelfth message and the thirteenth message, the terminal device may pack first data by using the main network protocol, to obtain the twelfth message. In addition, the terminal device packs second data by using the secondary network protocol, to obtain the thirteenth message. In an example, the terminal device may simultaneously send the twelfth message and the thirteenth message, so that a time domain resource occupied by the twelfth message partially or completely overlaps a time domain resource occupied by the thirteenth message. In an example, the terminal device may send the twelfth message and the thirteenth message at different moments, so that a time domain resource occupied by the twelfth message does not overlap a time domain resource occupied by the thirteenth message.

In the dual-connectivity mode, the terminal device communicates with one or more network devices.

For example, the terminal device may send the twelfth message to a network device 1 by using the main network protocol, and the terminal device may send the thirteenth message to a network device 2 by using the secondary network protocol.

The network device 1 may be the same as the network device in step 901.

In an example, the terminal device may send the twelfth message to a network device 3 by using the main network protocol, and may send the thirteenth message to the network device 3 by using the secondary network protocol.

The network device 3 may be the same as the network device in step 901.

The following uses three examples to describe specific types of the main network protocol and the secondary network protocol.

In an example, the type of the dual-connectivity mode is EN-DC. In this case, the main network protocol may be a 4G network protocol, and the secondary network protocol may be a 5G network protocol.

In an example, the type of the dual-connectivity mode is NE-DC. In this case, the main network protocol may be a 5G network protocol, and the secondary network protocol may be a 4G network protocol.

In an example, the type of the dual-connectivity mode is NGEN-DC. In this case, the main network protocol may be a 4G network protocol, and the secondary network protocol may be a 5G network protocol. A difference between NGEN-DC and EN-DC is that a core network of NGEN-DC is 5G, and a core network of EN-DC is 4G.

Because the twelfth transmit power of the terminal device is less than the theoretical maximum transmit power, the terminal device may increase transmit power corresponding to the secondary network protocol, to ensure that a message corresponding to the secondary network protocol can be successfully sent.

For example, it is assumed that the twelfth transmit power D is 19 dBm, and the theoretical maximum transmit power A corresponding to the main network protocol is 20 dBm. It is clear that D<A.

For a specific implementation of step 903, refer to step 502 in the embodiment shown in FIG. 5. Details are not described herein again.

904: In the dual-connectivity mode and the semi-persistent power sharing mode, the terminal device receives a fifth power control message and a sixth power control message, where the fifth power control message indicates to increase transmit power corresponding to the main network protocol, and the sixth power control message indicates to increase transmit power corresponding to the secondary network protocol.

In an example, as shown in (a) in FIG. 1, the terminal device accesses the cell 1, and communicates with the network device 1 in step 903 by using the main network protocol. The terminal device accesses the cell 2, and communicates with the network device 2 in step 903 by using the secondary network protocol. The terminal device may move from a center of the cell 2 to an edge of the cell 2, so that signal strength corresponding to the secondary network protocol decreases, and a signal interference degree corresponding to the secondary network protocol increases. Therefore, some data that originally needs to be sent by using the secondary network protocol may be sent by using the main network protocol. To ensure that the network device 1 can accurately receive data sent by using the main network protocol, the network device 1 may send a fifth power control message to the terminal device, to indicate the terminal device to increase the transmit power corresponding to the main network protocol. In other words, the fifth power control message may indicate the terminal device to send a message to the network device 1 at transmit power higher than the twelfth transmit power by using the main network protocol. The network device 2 may also send a sixth power control message to the terminal device, and the sixth power control message indicates the terminal device to increase the transmit power corresponding to the secondary network protocol. However, the maximum transmit power that can be implemented by the terminal device due to the limitation of the communications protocol is limited, and increasing the transmit power corresponding to the main network protocol means that the transmit power corresponding to the secondary network protocol may be reduced. In other words, a message is sent to the network device 2 at transmit power lower than the thirteenth transmit power by using the secondary network protocol. Consequently, communication between the terminal device and the network device 2 is more unfavorable.

In an example, as shown in (b) FIG. 1, the terminal device accesses the cell 3, and communicates with the network device 3 in step 903 by using the main network protocol. The terminal device accesses the cell 4, and communicates with the network device 3 by using the secondary network protocol. The terminal device may move from a center of the cell 4 to an edge of the cell 4, so that signal strength corresponding to the secondary network protocol decreases, and a signal interference degree corresponding to the secondary network protocol increases. Therefore, some data that originally needs to be sent by using the secondary network protocol may be sent by using the main network protocol. To ensure that the network device 3 can accurately receive data sent by using the main network protocol, the network device 3 may send a fifth power control message to the terminal device, to indicate the terminal device to increase the transmit power corresponding to the main network protocol. In other words, the fifth power control message may indicate the terminal device to send a message to the network device 3 at transmit power higher than the twelfth transmit power by using the main network protocol. The network device 3 may also send a sixth power control message to the terminal device, and the sixth power control message indicates the terminal device to increase the transmit power corresponding to the secondary network protocol. Because a priority of the main network protocol is higher, the terminal device originally needs to preferentially increase the transmit power corresponding to the main network protocol. However, the maximum transmit power that can be implemented by the terminal device due to the limitation of the communications protocol is limited, and increasing the transmit power corresponding to the main network protocol means that the transmit power corresponding to the secondary network protocol may be reduced. In other words, a message is sent to the network device 2 at transmit power lower than the thirteenth transmit power by using the secondary network protocol. Consequently, communication between the terminal device and the cell 4 is more unfavorable.

905: In the dual-connectivity mode and the semi-persistent power sharing mode, the terminal device sends a fourteenth message at fourteenth transmit power based on the fifth power control message by using the main network protocol, and sends a fifteenth message at fifteenth transmit power based on the sixth power control message by using the secondary network protocol, where the twelfth transmit power is greater than or equal to the fourteenth transmit power, the thirteenth transmit power is less than or equal to the fifteenth transmit power, and the fifteenth transmit power is greater than or equal to the theoretical maximum transmit power corresponding to the main network protocol.

When the fifth power control message indicates to increase the transmit power corresponding to the main network protocol, the terminal device does not increase the transmit power corresponding to the main network protocol. When the sixth power control message indicates to increase the transmit power corresponding to the secondary network protocol, the terminal device may increase the transmit power corresponding to the secondary network protocol. Because both the twelfth transmit power and the fourteenth transmit power are less than the theoretical maximum transmit power corresponding to the main network protocol, and the fifteenth transmit power is greater than the theoretical maximum transmit power corresponding to the main network protocol, neither the twelfth transmit power nor the fourteenth transmit power reaches the maximum transmit power that can be implemented by the terminal device due to the limitation of the communications protocol, or the theoretical maximum transmit power corresponding to the main network protocol. The thirteenth transmit power and the fifteenth transmit power may exceed the theoretical maximum transmit power corresponding to the main network protocol. If the message corresponding to the main network protocol and the message corresponding to the secondary network protocol are simultaneously sent, total transmit power may reach the maximum transmit power that can be implemented by the terminal device due to the limitation of the communications protocol. In other words, in the dual-connectivity mode and the semi-persistent power sharing mode, the terminal device may send the message corresponding to the main network protocol and the message corresponding to the secondary network protocol. The terminal device can send, at transmit power higher than the transmit power corresponding to the main network protocol, the message corresponding to the secondary network protocol.

Before the terminal device sends the fourteenth message and the fifteenth message, the terminal device may pack third data by using the main network protocol, to obtain the fourteenth message. In addition, the terminal device packs fourth data by using the secondary network protocol, to obtain the fifteenth message. In an example, the terminal device may simultaneously send the fourteenth message and the fifteenth message, so that a time domain resource occupied by the fourteenth message partially or completely overlaps a time domain resource occupied by the fifteenth message. In an example, the terminal device may send the fourteenth message and the fifteenth message at different moments, so that a time domain resource occupied by the fourteenth message does not overlap a time domain resource occupied by the fifteenth message.

In an example, the terminal device may send the twelfth message to the network device 1 in step 903. The terminal device may send the thirteenth message to the network device 2 in step 903.

In an example, the terminal device may send the twelfth message and the thirteenth message to the network device 3 in step 903.

It is assumed that the twelfth transmit power is D, the thirteenth transmit power is E, the fourteenth transmit power is F, the fifteenth transmit power is G, the theoretical maximum transmit power configured in the power class is C, and the theoretical maximum transmit power configured by the network device and corresponding to the main network protocol is A. In this case, $F \leq D < A \leq G$, and $E < G$.

Optionally, the twelfth transmit power is actual maximum transmit power corresponding to the main network protocol in the dual-connectivity mode and the semi-persistent power sharing mode.

That is, in the dual-connectivity mode and the semi-persistent power sharing mode, the terminal device does not send the message corresponding to the main network protocol at transmit power that exceeds the twelfth transmit power. Therefore, the twelfth transmit power may be maximum transmit power actually used by the terminal device to send a message by using the main network protocol in the dual-connectivity mode and the semi-persistent power sharing mode.

Optionally, the fifteenth transmit power is actual maximum transmit power corresponding to the secondary network protocol in the dual-connectivity mode and the semi-persistent power sharing mode.

That is, in the dual-connectivity mode and the semi-persistent power sharing mode, the terminal device does not send the message corresponding to the secondary network protocol at transmit power that exceeds the fifteenth transmit power. Therefore, the fifteenth transmit power may be maximum transmit power actually used by the terminal device to send a message by using the secondary network protocol in the dual-connectivity mode and the semi-persistent power sharing mode.

For example, it is assumed that the theoretical maximum transmit power C is 23 dBm, and actual maximum power that can be implemented by the terminal device due to the limitation of the communications protocol is 24 dBm. In this case, a value of the theoretical maximum transmit power A may be, for example, 20 dBm. Values of the twelfth transmit power D and the fourteenth transmit power F may both be, for example, 19 dBm. A value of the thirteenth transmit power E may be, for example, 21 dBm, and a value of the fifteenth transmit power G may be, for example, 22 dBm.

For example, it is assumed that the theoretical maximum transmit power C is 23 dBm, and actual maximum power that can be implemented by the terminal device due to the limitation of the communications protocol is 25 dBm. In this case, a value of the theoretical maximum transmit power A may be, for example, 20 dBm. A value of the twelfth transmit power D may be, for example, 19 dBm, and a value of the fourteenth transmit power F may be, for example, 18 dBm. A value of the thirteenth transmit power E may be, for example, 23 dBm, and a value of the fifteenth transmit power G may be, for example, 24 dBm.

Optionally, the dual-connectivity mode meets a power class 3.

Using the power class 3 as an example, theoretical maximum transmit power configured in the dual-connectivity mode is 23 dBm, and a tolerance is +2/−3 dBm. Therefore, in the dual-connectivity mode, the terminal device can use a maximum of 20 dBm to 25 dBm due to a limitation of a communications protocol.

It should be understood that the dual-connectivity mode may further support another power class. For different power classes, maximum transmit power configured in the dual-connectivity mode may be different. Therefore, a specific value of the second preset threshold is not limited in this application.

Optionally, a value of the twelfth transmit power is determined based on a service type corresponding to the second message.

Optionally, both the twelfth message and the fourteenth message correspond to a third service type, and before the sending a fourteenth message at fourteenth transmit power based on the fifth power control message by using the main network protocol, the method further includes: determining the fourteenth transmit power based on the third service type and the fifth power control message.

In other words, the terminal device may determine, based on the service type of the twelfth message and the service type of the fourteenth message, whether the transmit power needs to be further increased based on the twelfth transmit power. The following uses an example for detailed description.

There are a service type A and a service type B. A priority of the service type A is higher than that of the service type B. Therefore, maximum transmit power corresponding to the service type A may be slightly higher than maximum transmit power corresponding to the service type B. For example, the maximum transmit power corresponding to the service type A may be 25 dB, and the maximum transmit power corresponding to the service type B may be 23 dBm. If the twelfth message and the fourteenth message correspond to the service type A, because the fourteenth transmit power is less than or equal to the twelfth transmit power, the twelfth transmit power may be approximately 25 dBm. If the twelfth message and the fourteenth message correspond to the service type B, because the fourteenth transmit power is less than or equal to the twelfth transmit power, the twelfth transmit power is approximately 23 dBm. The service type A may be, for example, a voice over long term evolution (VoLTE) service. The service type B may be, for example, a web browsing service.

1001: A terminal device sends second indication information to a network device, where the second indication information indicates that a semi-persistent power sharing mode is supported in a dual-connectivity mode.

1002: The terminal device obtains theoretical maximum transmit power in the dual-connectivity mode and the semi-persistent power sharing mode, where the theoretical maximum transmit power corresponds to a main network protocol in the dual-connectivity mode.

1003: In the dual-connectivity mode and the semi-persistent power sharing mode, the terminal device sends a twelfth message at twelfth transmit power by using the main network protocol, and sends a thirteenth message at thirteenth transmit power by using a secondary network protocol in the dual-connectivity mode, where the twelfth transmit power is less than or equal to the theoretical maximum transmit power.

1004: In the dual-connectivity mode and the semi-persistent power sharing mode, the terminal device receives a fifth power control message and a sixth power control message, where the fifth power control message indicates to increase transmit power corresponding to the main network protocol, and the sixth power control message indicates to increase transmit power corresponding to the secondary network protocol.

1005: In the dual-connectivity mode and the semi-persistent power sharing mode, the terminal device sends a fourteenth message at fourteenth transmit power based on the fifth power control message by using the main network protocol, and sends a fifteenth message at fifteenth transmit power based on the sixth power control message by using the secondary network protocol, where the twelfth transmit power is greater than or equal to the fourteenth transmit power, the thirteenth transmit power is less than or equal to the fifteenth transmit power, the fifteenth transmit power is greater than or equal to the theoretical maximum transmit power corresponding to the main network protocol, and both the twelfth message and the fourteenth message correspond to a third service type.

For specific implementations of step 1001 to step 1005, refer to step 901 to step 905 in the embodiment shown in FIG. 9. Details are not described herein again.

1006: In the dual-connectivity mode and the semi-persistent power sharing mode, the terminal device sends a sixteenth message at sixteenth transmit power by using the main network protocol, and sends a seventeenth message by using the secondary network protocol, where the sixteenth message corresponds to a fourth service type.

1007: In the dual-connectivity mode and the semi-persistent power sharing mode, the terminal device receives a seventh power control message, where the seventh power control message indicates to increase the transmit power corresponding to the main network protocol.

1008: In the dual-connectivity mode and the semi-persistent power sharing mode, the terminal device sends an eighteenth message at seventeenth transmit power based on the seventh power control message by using the main network protocol, and sends a nineteenth message by using the secondary network protocol, where the eighteenth message corresponds to the fourth service type, and the seventeenth transmit power is less than or equal to the sixteenth transmit power, where when a priority of the third service type is higher than a priority of the fourth service type, the sixteenth transmit power is less than the twelfth transmit power; or when the priority of the third service type is lower than the priority of the fourth service type, the sixteenth transmit power is less than the twelfth transmit power.

In other words, when the terminal device sends messages of different services, the terminal device may flexibly adjust maximum transmit power corresponding to the main network protocol. The following uses an example for detailed description.

There are a service type A, a service type B, and a service type C. A priority of the service type A is higher than that of the service type B, and the priority of the service type B is higher than that of the service C. Therefore, maximum transmit power corresponding to the service type A may be slightly higher than maximum transmit power corresponding to the service type B. The maximum transmit power corresponding to the service type B may be slightly higher than maximum transmit power corresponding to the service type C. For example, the maximum transmit power corresponding to the service type A may be 25 dBm, the maximum transmit power corresponding to the service type B may be 23 dBm, and the maximum transmit power corresponding to the service type B may be 22 dBm. It is assumed that the twelfth message and the fourteenth message correspond to the service type B. Therefore, a maximum value of the twelfth transmit power may be 23 dBm. In a possible case, both the sixteenth message and the eighteenth message correspond to the service type A. Therefore, a maximum value of the sixteenth transmit power may be 25 dBm (that is, higher than the second transmit power). In a possible case, both the sixteenth message and the eighteenth message correspond to the service type C. Therefore, a maximum value of the sixteenth transmit power may be 22 dBm (that is, lower than the second transmit power). The service type A may be, for example, a voice over long term evolution (VoLTE) service. The service type B may be, for example, a video call service. The service type C may be, for example, a web browsing service.

The service type may include a VoLTE service, a web browsing service, a video play service, a video call service, and the like. Specific priorities of various services may not be limited in this application.

Figure 11:
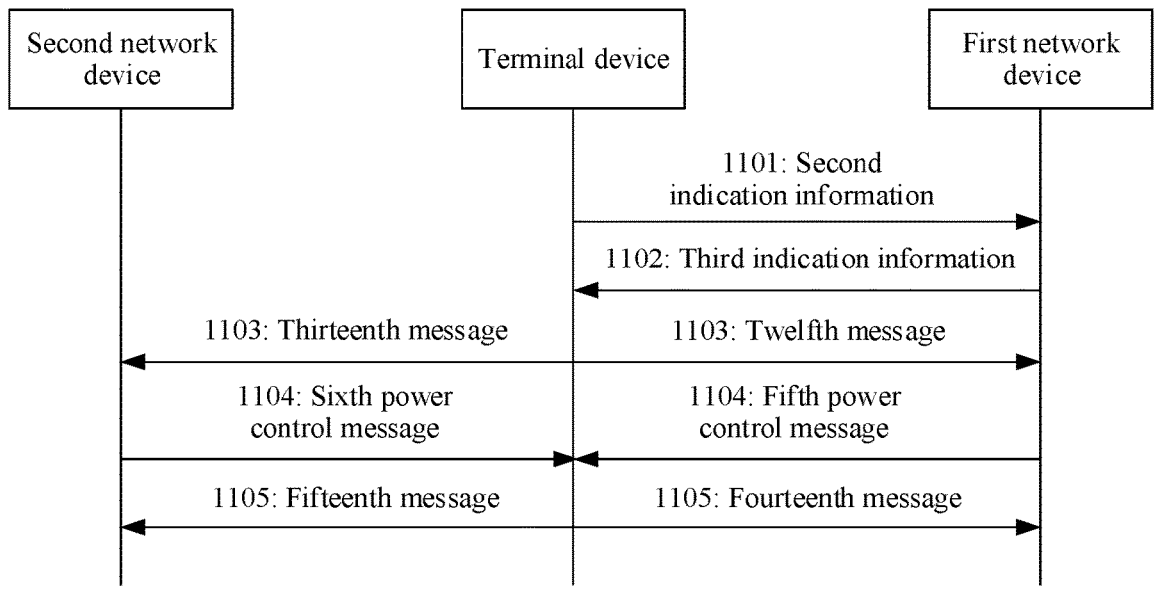
FIG. 11 is a schematic flowchart of a communication method according to an embodiment of this application.

With reference to (a) in FIG. 1, FIG. 11 shows a process of interaction between a terminal device and a plurality of network devices.

1101: A terminal device sends second indication information to a first network device, where the second indication information indicates that a semi-persistent power sharing mode is supported in a dual-connectivity mode.

1102: The terminal device receives third indication information sent by the first network device, where the third indication information indicates theoretical maximum transmit power in the dual-connectivity mode and the semi-persistent power sharing mode, and the theoretical maximum transmit power corresponds to a main network protocol in the dual-connectivity mode.

1103: In the dual-connectivity mode and the semi-persistent power sharing mode, the terminal device sends a twelfth message to the first network device at twelfth transmit power by using the main network protocol, and sends a thirteenth message to a second network device at thirteenth transmit power by using a secondary network protocol in the dual-connectivity mode, where the twelfth transmit power is less than or equal to the theoretical maximum transmit power.

1104: In the dual-connectivity mode and the semi-persistent power sharing mode, the terminal device receives a fifth power control message sent by the first network device, and receives a sixth power control message sent by the second network device, where the fifth power control message indicates to increase transmit power corresponding to the main network protocol, and the sixth power control message indicates to increase transmit power corresponding to the secondary network protocol.

1105: In the dual-connectivity mode and the semi-persistent power sharing mode, the terminal device sends a fourteenth message to the first network device at fourteenth transmit power based on the fifth power control message by using the main network protocol, and sends a fifteenth message to the second network device at fifteenth transmit power based on the sixth power control message by using the secondary network protocol, where the twelfth transmit power is greater than or equal to the fourteenth transmit power, the thirteenth transmit power is less than or equal to the fifteenth transmit power, and the fifteenth transmit power is greater than or equal to the theoretical maximum transmit power.

For specific implementations of step 1101 to step 1105, refer to step 901 to step 905 in the embodiment shown in FIG. 9. Details are not described herein again.

Figure 12:
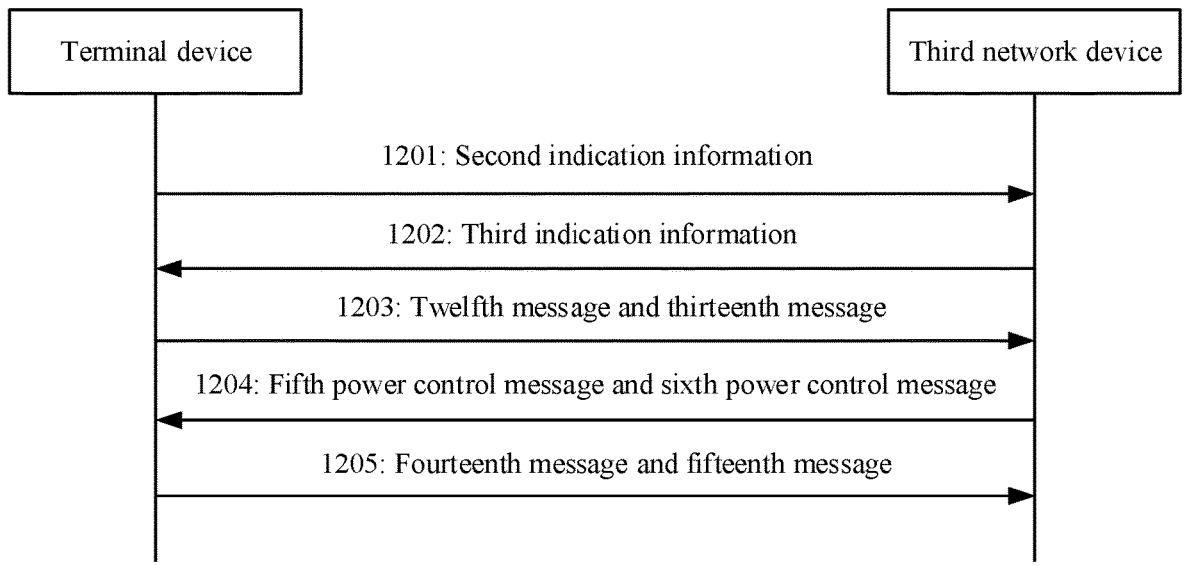
FIG. 12 is a schematic flowchart of a communication method according to an embodiment of this application.

With reference to (b) in FIG. 1, FIG. 12 shows a process of interaction between a terminal device and one network device.

1201: A terminal device sends second indication information to a third network device, where the second indication information indicates that a semi-persistent power sharing mode is supported in a dual-connectivity mode.

1202: The terminal device receives third indication information sent by the third network device, where the third indication information indicates theoretical maximum transmit power in the dual-connectivity mode and the semi-persistent power sharing mode, and the theoretical maximum transmit power corresponds to a main network protocol in the dual-connectivity mode.

1203: In the dual-connectivity mode and the semi-persistent power sharing mode, the terminal device sends a twelfth message to the third network device at twelfth transmit power by using the main network protocol, and sends a thirteenth message to the third network device at thirteenth transmit power by using a secondary network protocol in the dual-connectivity mode, where the twelfth transmit power is less than or equal to the theoretical maximum transmit power.

1204: In the dual-connectivity mode and the semi-persistent power sharing mode, the terminal device receives a fifth power control message and a sixth power control message that are sent by the third network device, where the fifth power control message indicates to increase transmit power corresponding to the main network protocol, and the sixth power control message indicates to increase transmit power corresponding to the secondary network protocol.

1205: In the dual-connectivity mode and the semi-persistent power sharing mode, the terminal device sends a fourteenth message to the third network device at fourteenth transmit power based on the fifth power control message by using the main network protocol, and sends a fifteenth message to the third network device at fifteenth transmit power based on the sixth power control message by using the secondary network protocol, where the twelfth transmit power is greater than or equal to the fourteenth transmit power, the thirteenth transmit power is less than or equal to the fifteenth transmit power, and the fifteenth transmit power is greater than or equal to the theoretical maximum transmit power.

For specific implementations of step 1201 to step 1205, refer to step 901 to step 905 in the embodiment shown in FIG. 9. Details are not described herein again.

Figure 13:
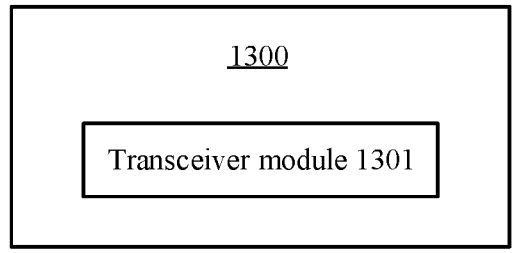
FIG. 13 is a schematic diagram of a structure of a communications apparatus according to an embodiment of this application.

FIG. 13 is a schematic diagram of a structure of a communications apparatus according to an embodiment of this application. The communications apparatus may be a terminal device, or may be a component (for example, a chip or a circuit) that can be used in the terminal device. As shown in FIG. 13, the communications apparatus 1300 may include a transceiver module 1301.

The transceiver module 1301 is configured to: in a single-connection mode, send a first message at first transmit power by using a first network protocol.

The transceiver module 1301 is further configured to: in a dual-connectivity mode and a dynamic power sharing mode, send a second message at second transmit power by using the first network protocol, and send a third message by using a second network protocol, where a time domain resource occupied by the second message at least partially overlaps a time domain resource occupied by the third message, the first network protocol is a main network protocol in the dual-connectivity mode, and the second network protocol is a secondary network protocol in the dual-connectivity mode.

The transceiver module 1301 is further configured to: in the dual-connectivity mode and the dynamic power sharing mode, receive a first power control message sent by a network device, where the first power control message indicates to increase transmit power corresponding to the first network protocol.

The transceiver module 1301 is further configured to: in the dual-connectivity mode and the dynamic power sharing mode, send a fourth message at third transmit power based on the first power control message by using the first network protocol, and send a fifth message by using the second network protocol, where a time domain resource occupied by the fourth message at least partially overlaps a time domain resource occupied by the fifth message, both the second transmit power and the third transmit power are less than the first transmit power, and the third transmit power is less than or equal to the second transmit power.

The transceiver module 1301 may be implemented by a receiver and/or a transmitter. For specific functions and beneficial effects of the transceiver module 1301, refer to the methods shown in FIG. 5 to FIG. 8. Details are not described herein again.

In a possible embodiment, a communications apparatus is further provided. The communications apparatus may be a terminal device, or may be a component (for example, a chip or a circuit) that can be used in the terminal device. The communications apparatus may include a transceiver and a processor, and optionally, may further include a memory. The transceiver may be configured to implement corresponding functions and operations of the receiving module and the sending module. The processor may be configured to implement a corresponding function and operation of the processing module. The memory may be configured to store executable instructions or application program code, and the processor controls execution of the executable instruction or the application program code, to implement the communication method provided in the foregoing embodiments of this application; and/or the memory may be configured to temporarily save some data, instruction information, and the like. The memory may be independent of the processor. In this case, the memory may be connected to the processor through a communications line. In another possible design, the memory may alternatively be integrated with the processor. This is not limited in this embodiment of this application.

Figure 14:
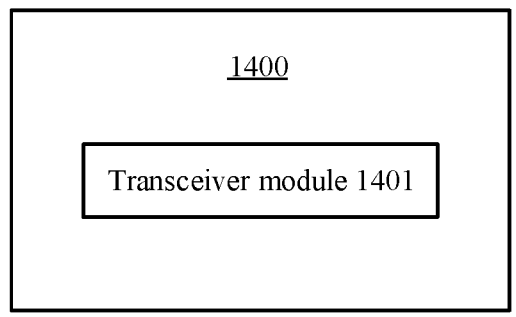
FIG. 14 is a schematic diagram of a structure of a communications apparatus according to an embodiment of this application.

FIG. 14 is a schematic diagram of a structure of a communications apparatus according to an embodiment of this application. The communications apparatus may be a terminal device, or may be a component (for example, a chip or a circuit) that can be used in the terminal device. As shown in FIG. 14, the communications apparatus 1400 may include a transceiver module 1401.

The transceiver module 1401 is configured to send second indication information to a network device, where the second indication information indicates that a semi-persistent power sharing mode is supported in a dual-connectivity mode.

The transceiver module 1401 is further configured to receive third indication information sent by the network device, where the third indication information indicates theoretical maximum transmit power in the dual-connectivity mode and the semi-persistent power sharing mode, and the theoretical maximum transmit power corresponds to a main network protocol in the dual-connectivity mode.

The transceiver module 1401 is further configured to: in the dual-connectivity mode and the semi-persistent power sharing mode, send a twelfth message at twelfth transmit power by using the main network protocol, and send a thirteenth message at thirteenth transmit power by using a secondary network protocol in the dual-connectivity mode.

The transceiver module 1401 is further configured to: in the dual-connectivity mode and the semi-persistent power sharing mode, receive a fifth power control message and a sixth power control message, where the fifth power control message indicates to increase transmit power corresponding to the main network protocol, and the sixth power control message indicates to increase transmit power corresponding to the secondary network protocol.

The transceiver module 1401 is further configured to: in the dual-connectivity mode and the semi-persistent power sharing mode, send a fourteenth message at fourteenth transmit power based on the fifth power control message by using the main network protocol, and send a fifteenth message at fifteenth transmit power based on the sixth power control message by using the secondary network protocol, where the twelfth transmit power is greater than or equal to the fourteenth transmit power, the twelfth transmit power is less than the first transmit power, the thirteenth transmit power is less than or equal to the fifteenth transmit power, and the fifteenth transmit power is greater than or equal to the first maximum transmit power.

The transceiver module 1401 may be implemented by a receiver and/or a transmitter. For specific functions and beneficial effects of the transceiver module 1401, refer to the methods shown in FIG. 9 to FIG. 12. Details are not described herein again.

In a possible embodiment, a communications apparatus is further provided. The communications apparatus may be a terminal device, or may be a component (for example, a chip or a circuit) that can be used in the terminal device. The communications apparatus may include a transceiver and a processor, and optionally, may further include a memory. The transceiver may be configured to implement corresponding functions and operations of the receiving module and the sending module. The processor may be configured to implement a corresponding function and operation of the processing module. The memory may be configured to store executable instructions or application program code, and the processor controls execution of the executable instruction or the application program code, to implement the communication method provided in the foregoing embodiments of this application; and/or the memory may be configured to temporarily save some data, instruction information, and the like. The memory may be independent of the processor. In this case, the memory may be connected to the processor through a communications line. In another possible design, the memory may alternatively be integrated with the processor. This is not limited in this embodiment of this application.

Figure 15:
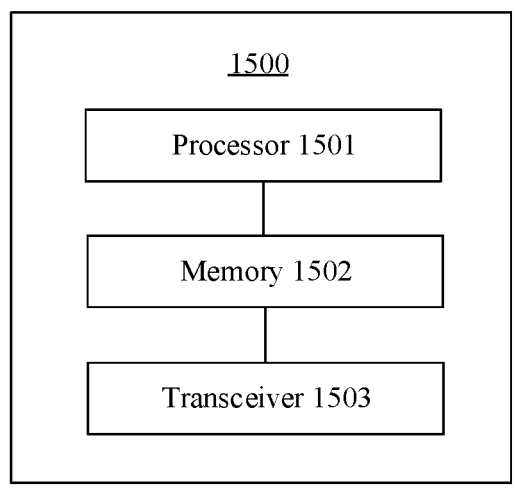
FIG. 15 is a schematic diagram of a structure of a communications apparatus according to an embodiment of this application.

FIG. 15 is a block diagram of a structure of a communications apparatus according to an embodiment of this application. The communications apparatus 1500 may be a terminal device. As shown in FIG. 15, the terminal device includes a processor 1501, a memory 1502, a radio frequency circuit, an antenna, and an input/output apparatus. The processor 1501 may be configured to: process a communications protocol and communications data, control the terminal device to execute a software program and process data of the software program, and the like. The memory 1502 is mainly configured to store the software program and the data. The radio frequency circuit is mainly configured to: perform conversion between a baseband signal and a radio frequency signal, and process a radio frequency signal. The antenna is mainly configured to receive and send the radio frequency signal in a form of an electromagnetic wave. The input/output apparatus, for example, a touchscreen, a display, or a keyboard, is mainly configured to: receive data entered by a user, and output data to the user. It should be noted that some types of terminal devices may have no input/output apparatus.

When the processor 1501 needs to send data, the processor 1501 outputs a baseband signal to the radio frequency circuit after performing baseband processing on the to-be-sent data. The radio frequency circuit performs radio frequency processing on the baseband signal and then sends the radio frequency signal in a form of an electromagnetic wave through the antenna. When the radio frequency circuit needs to send data to the terminal device, the radio frequency circuit receives a radio frequency signal through the antenna, converts the radio frequency signal into a baseband signal, and outputs the baseband signal to the processor. The processor converts the baseband signal into data and processes the data. For ease of description, FIG. 15 shows only one memory and only one processor. In an actual terminal device product, there may be one or more processors and one or more memories. The memory may also be referred to as a storage medium, a storage device, or the like. The memory may be disposed independently of the processor, or may be integrated into the processor. This is not limited in embodiments of this application.

In embodiments of this application, an antenna and a radio frequency circuit that have receiving and sending functions may be considered as a transceiver 1503 of the terminal device, and a processor having a processing function may be considered as a processing unit of the terminal device. The transceiver 1503 may also be referred to as a transceiver unit, a transceiver, a transceiver apparatus, or the like. The processing unit may also be referred to as a processor, a processing board, a processing module, a processing apparatus, or the like. Optionally, a component that is in the transceiver 1503 and that is configured to implement a receiving function may be considered as a receiving unit, and a component that is in the transceiver 1503 and that is configured to implement a sending function may be considered as a sending unit. In other words, the transceiver 1503 includes the receiving unit and the sending unit. Sometimes, the receiving unit may also be referred to as a receiver machine, a receiver, a receiving circuit, or the like. Sometimes, the sending unit may also be referred to as a transmitter machine, a transmitter, a transmitting circuit, or the like.

The processor 1501, the memory 1502, and the transceiver 1503 communicate with each other through an internal connection path, to transmit a control and/or data signal.

The methods disclosed in the foregoing embodiments of this application may be applied to the processor 1501, or may be implemented by the processor 1501. The processor 1501 may be an integrated circuit chip and has a signal processing capability. In an implementation process, the steps in the foregoing methods can be implemented by using a hardware integrated logic circuit in the processor 1501, or by using instructions in a form of software.

The foregoing processor in embodiments of this application may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and the logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in a decoding processor and a software module. The software module may be located in a mature storage medium in the art, such as a random access memory (RAM), a flash memory, a read-only memory (ROM), a programmable read-only memory, an electrically erasable programmable memory, or a register. The storage medium is located in the memory, and the processor reads instructions in the memory and completes the steps in the foregoing method in combination with hardware of the processor.

Optionally, in some embodiments, the communications apparatus 1500 supports a dynamic power sharing mode in a dual-connectivity mode. The transceiver 1503 is configured to: receive and send messages in a single-connection mode, and receive and send messages in the dual-connectivity mode by using a main network protocol and a secondary network protocol in the dual-connectivity mode. In the single-connection mode, maximum transmit power used by the transceiver 1503 to send a message is first maximum transmit power. In the dual-connectivity mode and the dynamic power sharing mode, maximum transmit power used by the transceiver 1503 to send a message corresponding to the main network protocol is second maximum transmit power. The second maximum transmit power is less than the first maximum transmit power.

In the single-connection mode, maximum transmit power 1 that can be used by the communications apparatus 1500 may be detected. In the dual-connectivity mode and the dynamic power sharing mode, maximum transmit power 2 that can be used by the communications apparatus 1500 and that corresponds to the main network protocol may be detected. If the maximum transmit power 1 is greater than the maximum transmit power 2, it indicates that, in the dual-connectivity mode, the communications apparatus 1500 does not send the message corresponding to the main network protocol at maximum transmit power that can be implemented by the apparatus.

Optionally, the maximum transmit power used by the transceiver 1503 to send the message corresponding to the secondary network protocol is third maximum transmit power. The processor 1501 is configured to determine preset transmit power corresponding to the secondary network protocol based on a power control message sent by a network device. A maximum value of the preset transmit power determined by the processor 1501 is fourth maximum transmit power, the fourth maximum transmit power is greater than or equal to the third maximum transmit power, and a difference between the fourth maximum transmit power and the third maximum transmit power is less than or equal to a first preset threshold.

Maximum transmit power 3 that is used by the communications apparatus 1500 and that corresponds to the secondary network protocol, and maximum preset transmit power, that is, maximum transmit power 4, that is determined by the communications apparatus 1500 and that corresponds to the secondary network protocol may be detected. If $10*\log_{10}(10^{\wedge}(\text{maximum transmit power } 4/10)-10^{\wedge}(\text{maximum transmit power } 3/10))$ is less than the first preset threshold, it indicates that the communications apparatus 1500 does not send the message corresponding to the secondary network protocol at excessively low transmit power.

Optionally, the maximum transmit power used by the transceiver 1503 to send the message corresponding to a first service type and the main network protocol is fifth maximum transmit power, and the maximum transmit power used by the transceiver 1503 to send the message corresponding to a second service type and the main network protocol is sixth maximum transmit power. When a priority of the first service type is higher than a priority of the second service type, the fifth maximum transmit power is greater than the sixth maximum transmit power; or when the priority of the first service type is lower than the priority of the second service type, the fifth maximum transmit power is less than the sixth maximum transmit power.

In the dual-connectivity mode and the dynamic power sharing mode, maximum transmit power of different services may be detected, to determine whether the communications apparatus 1500 can flexibly adjust maximum transmit power based on a service type.

Optionally, the first preset threshold may be 3 dBm or 6 dBm.

Optionally, the dual-connectivity mode meets a power class 3.

Optionally, in some embodiments, the communications apparatus 1500 supports a semi-persistent power sharing mode in a dual-connectivity mode. The transceiver 1503 is configured to: in the dual-connectivity mode and the semi-persistent power sharing mode, receive and send messages by using a main network protocol and a secondary network protocol in the dual-connectivity mode; receive third indication information sent by a network device, where the third indication information indicates theoretical maximum transmit power corresponding to the main network protocol in the dual-connectivity mode and the semi-persistent power sharing mode. In the dual-connectivity mode and the semi-persistent power sharing mode, maximum transmit power used by the transceiver 1503 to send a message corresponding to the main network protocol is seventh maximum transmit power, maximum transmit power used by the transceiver 1503 to send a message corresponding to the secondary network protocol is eighth maximum transmit power, the seventh maximum transmit power is less than the theoretical maximum transmit power, and the eighth maximum transmit power is greater than the theoretical maximum transmit power.

In the dual-connectivity mode and the semi-persistent power sharing mode, theoretical maximum transmit power configured by the network device, maximum transmit power 7 that can be used by the communications apparatus 1500 and that corresponds to the main network protocol, and maximum transmit power 8 that can be used by the communications apparatus 1500 and that corresponds to the main network protocol may be detected. If the maximum transmit power 7 is less than the theoretical maximum transmit power, and the maximum transmit power 8 is greater than the theoretical maximum transmit power, it indicates that, in the dual-connectivity mode and the semi-persistent power sharing mode, the communications apparatus 1500 may send the message corresponding to the secondary network protocol at higher power.

Optionally, the maximum transmit power used by the transceiver 1503 to send the message corresponding to a third service type and the main network protocol is ninth maximum transmit power, and the maximum transmit power used by the transceiver 1503 to send the message corresponding to a fourth service type and the main network protocol is tenth maximum transmit power. When a priority of the third service type is higher than a priority of the fourth service type, the ninth maximum transmit power is greater than the tenth maximum transmit power; or when the priority of the third service type is lower than the priority of the fourth service type, the ninth maximum transmit power is less than the tenth maximum transmit power.

In the dual-connectivity mode and the semi-persistent power sharing mode, maximum transmit power of different services may be detected, to determine whether the communications apparatus 1500 can flexibly adjust maximum transmit power based on a service type.

Optionally, the dual-connectivity mode meets a power class 3.

Optionally, in some embodiments, the memory 1502 may store instructions used to perform the method performed by the terminal device in the methods shown in FIG. 5 to FIG. 12. The processor 1501 may execute the instructions stored in the memory 1502 to complete, in combination with other hardware (for example, the transceiver 1503), the steps performed by the terminal device in the methods shown in FIG. 5 to FIG. 12. For a specific operation process and beneficial effects, refer to the descriptions in the embodiments shown in FIG. 5 to FIG. 12.

An embodiment of this application further provides a chip, and the chip includes a transceiver unit and a processing unit. The transceiver unit may be an input/output circuit or a communication interface. The processing unit is a processor, a microprocessor, or an integrated circuit integrated on the chip. The chip may perform the method on the terminal device side in the foregoing method embodiments.

An embodiment of this application further provides a computer-readable storage medium. The computer-readable storage medium stores instructions, and when the instructions are executed, the method on the terminal device side in the foregoing method embodiments is performed.

An embodiment of this application further provides a computer program product including instructions. When the instructions are executed, the method on the terminal device side in the foregoing method embodiments is performed.

A person of ordinary skill in the art may be aware that, units and algorithm steps in examples described with reference to embodiments disclosed in this specification can be implemented by electronic hardware or a combination of computer software and electronic hardware. Whether functions are performed by hardware or software depends on particular applications and design constraints of the technical solutions. A person skilled in the art may use different methods to implement the described functions for each particular application, but it should not be considered that the implementation goes beyond the scope of this application.

It can be clearly understood by a person skilled in the art that, for a purpose of convenient and brief descriptions, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one location, or may be distributed on a plurality of network units. Some or all of the units may be selected based on actual requirements to achieve the objective of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, applied in a terminal device, wherein the method comprising:
    in a single-connection mode, sending a first message at a first transmit power using a first network protocol;
    in a dual-connectivity mode and a dynamic power sharing mode, sending a second message at a second transmit power using the first network protocol, and sending a third message using a second network protocol, wherein a time domain resource occupied by the second message at least partially overlaps a time domain resource occupied by the third message, the first network protocol is a main network protocol in the dual-connectivity mode, and the second network protocol is a secondary network protocol in the dual-connectivity mode;
    in the dual-connectivity mode and the dynamic power sharing mode, receiving a first power control message sent by a network device, wherein the first power control message indicates to increase transmit power corresponding to the first network protocol; and
    in the dual-connectivity mode and the dynamic power sharing mode, sending a fourth message at a third transmit power based on the first power control message using the first network protocol, and sending a fifth message using the second network protocol, wherein a time domain resource occupied by the fourth message at least partially overlaps a time domain resource occupied by the fifth message, the second transmit power is less than the first transmit power, and the third transmit power is less than or equal to the second transmit power.

2. The communication method according to claim 1, wherein the second transmit power is a maximum transmit power used to send a message by using the first network protocol in the dual-connectivity mode and the dynamic power sharing mode.

3. The communication method according to claim 1, wherein before the sending a fifth message using the second network protocol, the method further comprises:
    in the dual-connectivity mode and the dynamic power sharing mode, receiving a second power control message sent by the network device, wherein the second power control message indicates to increase transmit power corresponding to the second network protocol; and
    in the dual-connectivity mode and the dynamic power sharing mode, determining, based on the second power control message, a target preset transmit power used to send the fifth message; and
    the sending a fifth message using the second network protocol comprises:
    sending the fifth message at a fifth transmit power using the second network protocol, wherein a difference between the target preset transmit power and the fifth transmit power is less than or equal to a first preset threshold.

4. The communication method according to claim 3, wherein the first preset threshold is 3 decibel-milliwatts or 6 decibel-milliwatts.

5. The communication method according to claim 1, wherein both the second message and the fourth message correspond to a first service type, and the method further comprises:
    in the dual-connectivity mode and the dynamic power sharing mode, sending a sixth message at a sixth transmit power using the first network protocol, and sending a seventh message using the second network protocol, wherein a time domain resource occupied by the sixth message at least partially overlaps a time domain resource occupied by the seventh message, the sixth message corresponds to a second service type, and the sixth transmit power is less than the first transmit power;
    in the dual-connectivity mode and the dynamic power sharing mode, receiving a third power control message sent by the network device, wherein the third power control message indicates to increase the transmit power corresponding to the first network protocol; and
    in the dual-connectivity mode and the dynamic power sharing mode, sending an eighth message at a seventh transmit power based on the third power control message using the first network protocol, and sending a ninth message using the second network protocol, wherein a time domain resource occupied by the eighth message at least partially overlaps a time domain resource occupied by the ninth message, the eighth message corresponds to the second service type, and the seventh transmit power is less than or equal to the sixth transmit power, wherein
    when a priority of the first service type is higher than a priority of the second service type, the sixth transmit power is less than the second transmit power; or
    when the priority of the first service type is lower than the priority of the second service type, the sixth transmit power is greater than the second transmit power.

6. The communication method according to claim 1, wherein in the dual-connectivity mode and the dynamic power sharing mode, a maximum transmit power used to send a message using the first network protocol is equal to a maximum transmit power configured in a power class, and the dual-connectivity mode meets the power class.

7. The communication method according to claim 6, wherein the power class is a power class 3.

8. The communication method according to claim 1, wherein the fifth message comprises uplink control information.

9. A communication method, applied in a terminal device, wherein the method comprising:

sending second indication information to a network device, wherein the second indication information indicates that a semi-persistent power sharing mode is supported in a dual-connectivity mode;
obtaining a theoretical maximum transmit power in the dual-connectivity mode and the semi-persistent power sharing mode, wherein the theoretical maximum transmit power corresponds to a main network protocol in the dual-connectivity mode;
in the dual-connectivity mode and the semi-persistent power sharing mode, sending a twelfth message at a twelfth transmit power using the main network protocol, and sending a thirteenth message at a thirteenth transmit power using a secondary network protocol in the dual-connectivity mode;
in the dual-connectivity mode and the semi-persistent power sharing mode, receiving a fifth power control message and a sixth power control message, wherein the fifth power control message indicates to increase a transmit power corresponding to the main network protocol, and the sixth power control message indicates to increase a transmit power corresponding to the secondary network protocol; and
in the dual-connectivity mode and the semi-persistent power sharing mode, sending a fourteenth message at a fourteenth transmit power based on the fifth power control message using the main network protocol, and sending a fifteenth message at a fifteenth transmit power based on the sixth power control message using the secondary network protocol, wherein
the twelfth transmit power is greater than or equal to the fourteenth transmit power, the twelfth transmit power is less than the theoretical maximum transmit power, the thirteenth transmit power is less than or equal to the fifteenth transmit power, and the fifteenth transmit power is greater than or equal to the theoretical maximum transmit power.

10. The communication method according to claim 9, wherein the twelfth transmit power is an actual maximum transmit power corresponding to the main network protocol in the dual-connectivity mode and the semi-persistent power sharing mode.

11. The communication method according to claim 9, wherein both the twelfth message and the fourteenth message correspond to a third service type, and the method further comprises:
in the dual-connectivity mode and the semi-persistent power sharing mode, sending a sixteenth message at sixteenth transmit power by using the main network protocol, and sending a seventeenth message by using the secondary network protocol, wherein the sixteenth message corresponds to a fourth service type;
in the dual-connectivity mode and the semi-persistent power sharing mode, receiving a seventh power control message, wherein the seventh power control message indicates to increase the transmit power corresponding to the main network protocol; and
in the dual-connectivity mode and the semi-persistent power sharing mode, sending an eighteenth message at a seventeenth transmit power based on the seventh power control message using the main network protocol, and sending a nineteenth message using the secondary network protocol, wherein the eighteenth message corresponds to the fourth service type, and the seventeenth transmit power is less than or equal to the sixteenth transmit power, wherein when a priority of the third service type is higher than a priority of the fourth service type, the sixteenth transmit power is less than the twelfth transmit power; or
when the priority of the third service type is lower than the priority of the fourth service type, the sixteenth transmit power is greater than the twelfth transmit power.

12. A terminal device, comprising:
a transceiver configured to: in a single-connection mode, send a first message at first transmit power by using a first network protocol, wherein
the transceiver is further configured to: in a dual-connectivity mode and a dynamic power sharing mode, send a second message at a second transmit power using the first network protocol, and send a third message using a second network protocol, wherein a time domain resource occupied by the second message at least partially overlaps a time domain resource occupied by the third message, the first network protocol is a main network protocol in the dual-connectivity mode, and the second network protocol is a secondary network protocol in the dual-connectivity mode; and
the transceiver is further configured to: in the dual-connectivity mode and the dynamic power sharing mode, receive a first power control message sent by a network device, wherein the first power control message indicates to increase a transmit power corresponding to the first network protocol, wherein
the transceiver is further configured to: in the dual-connectivity mode and the dynamic power sharing mode, send a fourth message at a third transmit power based on the first power control message the first network protocol, and send a fifth message using the second network protocol, wherein a time domain resource occupied by the fourth message at least partially overlaps a time domain resource occupied by the fifth message, the second transmit power is less than the first transmit power, and the third transmit power is less than or equal to the second transmit power.

13. The terminal device according to claim 12, wherein the second transmit power is a maximum transmit power used by the sending module to send a message using the first network protocol in the dual-connectivity mode and the dynamic power sharing mode.

14. The terminal device according to claim 12, wherein the transceiver is further configured to: before the transceiver sends the fifth message using the second network protocol, in the dual-connectivity mode and the dynamic power sharing mode, receive a second power control message sent by the network device, wherein the second power control message indicates to increase transmit power corresponding to the second network protocol; and
the terminal device further comprises:
a processor configured to: in the dual-connectivity mode and the dynamic power sharing mode, determine, based on the second power control message, a target preset transmit power used to send the fifth message, wherein
the transceiver is configured to send the fifth message at a fifth transmit power using the second network protocol, wherein a difference between the target preset transmit power and the fifth transmit power is less than or equal to a first preset threshold.

15. The terminal device according to claim 14, wherein the first preset threshold is 3 decibel-milliwatts or 6 decibel-milliwatts.

16. The terminal device according to claim 12, wherein both the second message and the fourth message correspond to a first service type;
- the transceiver is further configured to: in the dual-connectivity mode and the dynamic power sharing mode, send a sixth message at a sixth transmit power using the first network protocol, and send a seventh message using the second network protocol, wherein a time domain resource occupied by the sixth message at least partially overlaps a time domain resource occupied by the seventh message, the sixth message corresponds to a second service type, and the sixth transmit power is less than the first transmit power;
- the transceiver is further configured to: in the dual-connectivity mode and the dynamic power sharing mode, receive a third power control message sent by the network device, wherein the third power control message indicates to increase the transmit power corresponding to the first network protocol; and
- the transceiver is further configured to: in the dual-connectivity mode and the dynamic power sharing mode, send an eighth message at a seventh transmit power based on the third power control message using the first network protocol, and send a ninth message using the second network protocol, wherein a time domain resource occupied by the eighth message at least partially overlaps a time domain resource occupied by the ninth message, the eighth message corresponds to the second service type, and the seventh transmit power is less than or equal to the sixth transmit power, wherein
- when a priority of the first service type is higher than a priority of the second service type, the sixth transmit power is less than the second transmit power; or
- when the priority of the first service type is lower than the priority of the second service type, the sixth transmit power is greater than the second transmit power.

17. The terminal device according to claim 12, wherein in the dual-connectivity mode and the dynamic power sharing mode, a maximum transmit power used to send a message using the first network protocol is equal to a maximum transmit power configured in a power class, and the dual-connectivity mode meets the power class.

18. The terminal device according to claim 17, wherein the power class is a power class 3.

19. The terminal device according to claim 12, wherein the fifth message comprises uplink control information.

20. A terminal device, comprising:
- a transceiver configured to send second indication information to a network device, wherein the second indication information indicates that a semi-persistent power sharing mode is supported in a dual-connectivity mode; and
- a processor configured to obtain a theoretical maximum transmit power in the dual-connectivity mode and the semi-persistent power sharing mode, wherein the theoretical maximum transmit power corresponds to a main network protocol in the dual-connectivity mode, wherein
- the transceiver is further configured to: in the dual-connectivity mode and the semi-persistent power sharing mode, send a twelfth message at a twelfth transmit power using the main network protocol, and send a thirteenth message at a thirteenth transmit power using a secondary network protocol in the dual-connectivity mode;
- the processor is further configured to: in the dual-connectivity mode and the semi-persistent power sharing mode, receive a fifth power control message and a sixth power control message, wherein the fifth power control message indicates to increase a transmit power corresponding to the main network protocol, and the sixth power control message indicates to increase a transmit power corresponding to the secondary network protocol; and
- the transceiver is further configured to: in the dual-connectivity mode and the semi-persistent power sharing mode, send a fourteenth message at a fourteenth transmit power based on the fifth power control message using the main network protocol, and send a fifteenth message at a fifteenth transmit power based on the sixth power control message by using the secondary network protocol, wherein
- the twelfth transmit power is greater than or equal to the fourteenth transmit power, the twelfth transmit power is less than the theoretical maximum transmit power, the thirteenth transmit power is less than or equal to the fifteenth transmit power, and the fifteenth transmit power is greater than or equal to the theoretical maximum transmit power.

* * * * *

UNITED STATES PATENT AND TRADEMARK OFFICE
CERTIFICATE OF CORRECTION

PATENT NO. : 12,185,260 B2  
APPLICATION NO. : 17/789470  
DATED : December 31, 2024  
INVENTOR(S) : Chen et al.

Page 1 of 1

It is certified that error appears in the above-identified patent and that said Letters Patent is hereby corrected as shown below:

In the Claims

Claim 2: Column 51, Line 59: "power used to send a message by using the first network" should read as -- power used to send a message using the first network --.

Claim 11: Column 53, Line 50: "sixteenth transmit power by using the main network" should read as -- sixteenth transmit power using the main network --.

Claim 11: Column 53, Line 51: "protocol, and sending a seventeenth message by using" should read as -- protocol, and sending a seventeenth message using --.

Claim 20: Column 56, Line 9: "a processor configured to obtain a theoretical maximum" should read as -- an processor configured to obtain a theoretical maximum --.

Claim 20: Column 56, Line 37: "the sixth power control message by using the secondary" should read as -- the sixth power control message using the secondary --.

Signed and Sealed this  
Seventeenth Day of June, 2025

Coke Morgan Stewart  
*Acting Director of the United States Patent and Trademark Office*